(12) United States Patent
Hefeeda et al.

(10) Patent No.: US 10,152,048 B2
(45) Date of Patent: Dec. 11, 2018

(54) CONTROL SYSTEM AND METHOD FOR REMOTE CONTROL OF HARDWARE COMPONENTS

(71) Applicant: Qatar Foundation, Doha (QA)

(72) Inventors: Mohamed M. Hefeeda, Doha (QA); Tamir A. Hegazy, Doha (QA)

(73) Assignee: Qatar Foundation, Doha (QA)

( * ) Notice: Subject to any disclaimer, the term of this patent is extended or adjusted under 35 U.S.C. 154(b) by 561 days.

(21) Appl. No.: 14/767,353

(22) PCT Filed: Apr. 26, 2013

(86) PCT No.: PCT/EP2013/058792
§ 371 (c)(1),
(2) Date: Aug. 12, 2015

(87) PCT Pub. No.: WO2014/124701
PCT Pub. Date: Aug. 21, 2014

(65) Prior Publication Data
US 2015/0378356 A1 Dec. 31, 2015

(30) Foreign Application Priority Data

Feb. 13, 2013 (GB) .................................. 1302534.1

(51) Int. Cl.
*G05B 15/02* (2006.01)
*G05B 19/418* (2006.01)
(Continued)

(52) U.S. Cl.
CPC ... *G05B 19/41855* (2013.01); *G05B 19/0426* (2013.01); *G05B 19/4185* (2013.01);
(Continued)

(58) Field of Classification Search
CPC .................................. Y02P 90/14; Y02P 90/18
(Continued)

(56) References Cited

U.S. PATENT DOCUMENTS 6,264,111 B1 *  7/2001  Nicolson ............... F24F 11/006
                                                    236/49.3
2011/0054640 A1 *  3/2011  Law ...................... G05B 19/418
                                                    700/14
(Continued)

FOREIGN PATENT DOCUMENTS

WO  WO 2011/099874 A1  8/2011
WO  WO 2011/154212 A1  12/2011

OTHER PUBLICATIONS

Abdelzaher, T., et al., "Introduction to Control Theory and Its Application to Computing Systems," in Performance Modeling and Engineering, Springer US, 2008, 33 pgs.
(Continued)

*Primary Examiner* — Mohammad Ali
*Assistant Examiner* — Md Azad
(74) *Attorney, Agent, or Firm* — Martin & Ferraro, LLP

(57) ABSTRACT

A control system includes first and second hardware components and a server which is remote from the hardware components. The server is a server in the cloud which is connected via the Internet to the hardware components. A control module is implemented as a service running on the server and the control module is operable to communicate with the hardware components to control at least one of the hardware components.

17 Claims, 12 Drawing Sheets

Figure 1:
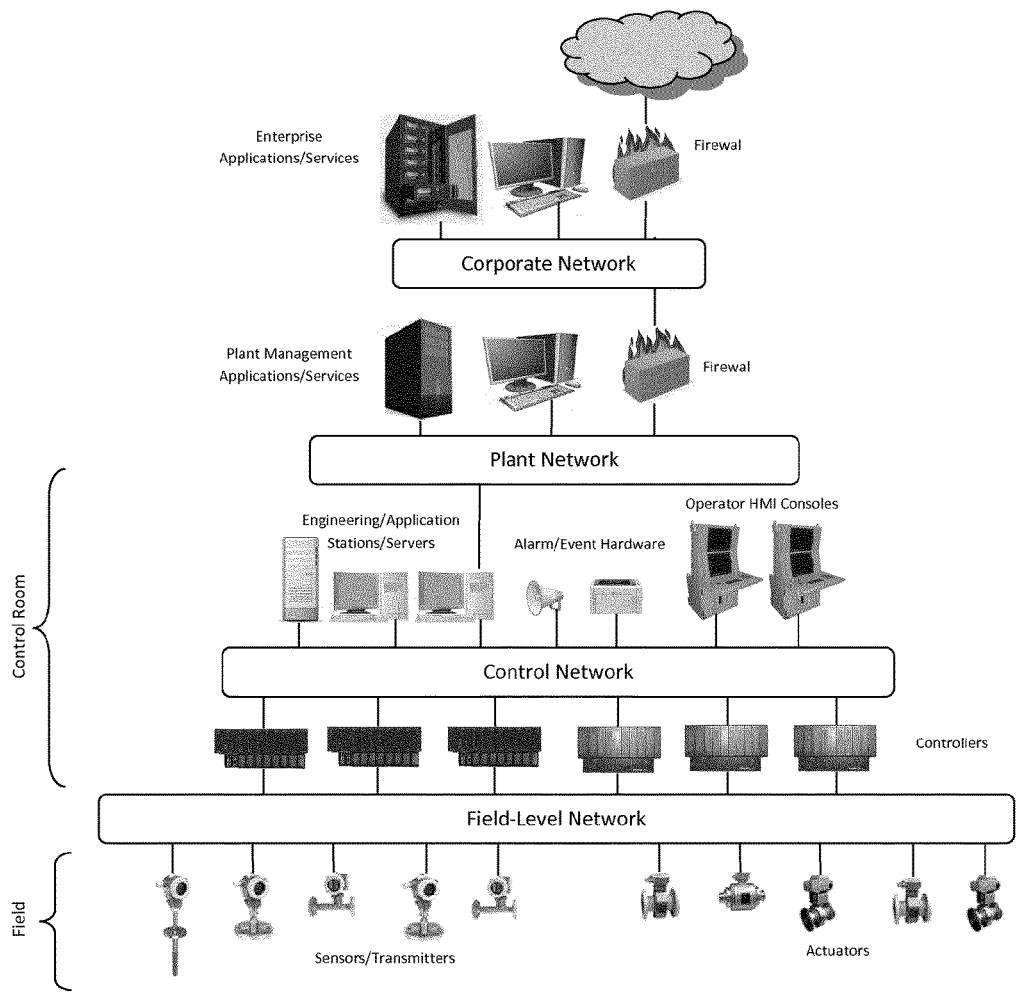

(51) Int. Cl.
*G05B 19/042* (2006.01)
*G06F 9/50* (2006.01)

(52) U.S. Cl.
CPC .............. *G05B 2219/25202* (2013.01); *G05B 2219/31115* (2013.01); *G05B 2219/31241* (2013.01); *G06F 9/5077* (2013.01); *Y02P 90/14* (2015.11); *Y02P 90/18* (2015.11)

(58) Field of Classification Search
USPC .......................................................... 700/9
See application file for complete search history.

(56) References Cited

U.S. PATENT DOCUMENTS

| | | | | |
|---|---|---|---|---|
| 2012/0009868 | A1* | 1/2012 | Williams | H04W 4/06 455/15 |
| 2012/0316658 | A1* | 12/2012 | Glew | G06Q 10/06 700/1 |
| 2013/0041485 | A1* | 2/2013 | Gunzert | G05B 19/4186 700/79 |
| 2013/0211546 | A1* | 8/2013 | Lawson | G05B 19/4185 700/9 |
| 2015/0192907 | A1* | 7/2015 | Blevins | G05B 17/02 700/11 |

OTHER PUBLICATIONS

Acromag, "Introduction to Modbus TCP/IP," http://www.acromag.com/sites/default/files/Acromag_Intro_ModbusTCP_765A.pdf, 2005, 42 pgs.
Bendtsen, J., et al. "Bumpless Transfer Between Advanced Controllers with Applications to Power Plant Control," Proceedings of the 42nd IEEE Conference on Decision and Control, pp. 2059-2064, Dec. 2003, 6 pgs.
Bjorkqvist, M., et al., "Minimizing Retrieval Latency for Content Cloud," Proceedings of IEEE INFOCOM, Apr. 2011, 9 pgs.
Chen, Y. et al., "Robot as a Service in Cloud Computing," 2010 Fifth IEEE International Symposium on Service Oriented System Engineering, Jun. 2010, pp. 151-158, 8 pgs.
Chen, Z., et al., "Networked Control System with Network Time-Delay Compensation," Proc. of Industry Applications Conference, vol. 4, pp. 2435-2440, Oct. 2005, 6 pgs.
Desborough, L., et al., "Increasing Customer Value of Industrial Control Performance Monitoring—Honeywell's Experience," Preprint of Chemical Process Control, pp. 172-192, Jan. 2002, 21 pgs.
Gabale, V., et al., "InSite: QoE-aware Video Delivery From Cloud Data Centers," Proc. of International Symposium on QoS, pp. 1-9, Jun. 2012, 9 pgs.
Gao, X., et al., "Feedback Control for Router Congestion Resolution," Proc. of ACM Symposium on Principles of Distributed Computing, pp. 218-226, Jul. 17, 2005, 9 pgs.
Herrmann, U., et al., "Two-tank Molten Salt Storage for Parabolic Trough Solar Power Plants," Energy 29(5-6):883-893, Mar. 2004, 11 pgs.
Internet Delay Space Synthesizer, "DS2: Delay Space Synthesizer," available at http://www.cs.rice.edu/~bozhang/ds2/, Aug. 2013, 3 pgs.
Kumar, S., et al., "A Cloud-Assisted Design for Autonomous Driving," Proc. of SIGCOMM MCC workshop on Mobile Cloud Computing, MCC'12, pp. 41-46, Aug. 17, 2012, 6 pgs.
Patras, P., et al., "A Control Theoretic Scheme for Efficient Video Transmission Over IEEE 802.11e EDCA WLANS," ACM Transactions on Multimedia Computing Communications and Applications; 8(3):29:1-29:23; Jul. 2012, 23 pgs.
Sherry, J., et al., "Making Middleboxes Someone Else's Problem: Network Processing as a Cloud Service," Proc. of SIGCOMM, pp. 13-24, Aug. 2012, 12 pgs.
Smaragdakis, G., et al., "A Feedback Control Approach to Mitigating Mistreatment in Distributed Caching Groups," Proc. of IFIP-TC6 Conference on Networking Technologies, Services, and Protocols, May 2006, 12 pgs.
Siemens, "Smith Predictor for Control of Processes with Dead Times," Applications for Process Automation, Version V1.0, http://support.automation.siemens.com/WW/view/en/37361207, Jul. 9, 2009, 32 pgs.
Wood, T., et al., "Disaster Recovery as a Cloud Service: Economic Benefits & Deployment Challenges," Proc. of USENIX Conference on Hot Topics in Cloud Computing, Jun. 2010, 7 pgs.
Xu, X., "From Cloud Computing to Cloud Manufacturing," Robotics and Computer-Integrated Manufacturing, 28(2012):75-86, Aug. 2011, 12 pgs.
Yang, Y., et al., "A Networked Control System with Stochastically Varying Transmission Delay and Uncertain Process Parameters," Proc. of IFAC, 16th Triennial World Congress, vol. 16, pp. 91-97, 2005, 6 pgs.
Yang, S., et al., "Time Delay and Data Loss Compensation for Internet-Based Process Control Systems," Transactions of the Institute of Measurement and Control, 27, 2, (2005):103-118, 2005, 16 pgs.
Combs, "Cloud Computing for SCADA," Internet: URL:http://www.controleng.com/single-article/cloud-computing-for-scada/8a6ea192e6Occ626d2e3fc3a5686396d.htm, pp. 1-3, Dec. 15, 2011, 3 pgs.

* cited by examiner

```
begin routine: main()
      for each VM V_k
            S_k = ▯;        // set of controllers running on V_j initially empty
            read U_k, B_k;
      next V_k
      isAllocated = FALSE;
      for each controller C_i
            read u_i, b_i;
            allocate(C_i, S_1, S_2,..., isAllocated);
      next C_i
end routine begin routine: allocate(C_i, S_1, S_2,..., isAllocated)
      isAllocated = FALSE;
      for each VM V_k
            tempS_k = S_k U {C_i};
            n = size(tempS_k);
            U = totalCpuUtil(tempS_k);  //sum of CPU utilization of controllers in tempS_k
            B = totalBw(tempS_k);       //sum of bandwidth of controllers in tempS_k
            //rate monotonic schedulability test and bandwidth test
            if U<=n*(2^(1/n)-1)  and B <= B_k
                  S_k = tempS_k;
                  isAllocated = TRUE;
                  exit for;
            end if
      next V_k
end routine
```

Figure 3

(a) Traditional feedback control loop (b) Delay introduced by moving the controller to the cloud (c) Model of the feedback cloud control loop (d) Proposed delay block at set point entrance (e) System equivalent to process with dead-time

```
begin scan
begin step: Initialization
if firstCycle
  initialize(myID);
  initialize(myEngagementThreshold);
end if
end step
begin step: Polling
isTimedOut = pollIO(processVar, lastAction, lastActionAge(1:n)]);
  if isTimedOut
    firstCycle = TRUE; end scan;
  end if
end step
begin step: Computing
iAmEngaged = TRUE;
for index = 1 to myID - 1
  if lastActionAge(index) < myEngagementThreshold
    iAmEngaged = FALSE;
    exit for;
  end if
end for
myNextAction = controller(processVar, iAmEngaged, lastAction);
end step
begin step: Conditional Acting
if iAmEngaged
  writeToIO(lastAction:= myNextAction, lastActionAge(myID):= 0);
end if
end step
end scan
```

Figure 7

```
//The following are controller parameters and are read from a configuration
file/database upon start
SetPoint
Kc //controller gain
Ts //sampling period
Td // derivative time
Ti // integral time
IntegratorInitValue begin function: controller(processVar, iAmEngaged, lastAction)
error = setPoint - processVar;
P = Kc * error;
D = Kc*Td*(error - previous_error)/Ts;

if (not iAmEngaged)
     IntegratorInitValue = lastAction - P - D;
     //lastAction is the last action performed by the engaged controller
end if I = Kc*error*Ts/Ti + IntegratorInitValue;
previous_error = error;
IntegratorInitValue = I;
action = P + I + D;

return action;
end function
```

Figure 8

Table 1: Performance metrics with and without the proposed delay compensator.

| Delay | $\mu$ s | 0 | 1 | 2 | 4 |
|---|---|---|---|---|---|
| | $\sigma$ s | 0 | 0.7 | 1.4 | 2.8 |
| Distrib. | $max$ s | 0 | 5 | 10 | 20 |
| Uncomp-ensated | $M_p$ % | 0 | 13 | 35.8 | 170.9 |
| | $e_{ss}$ | 0 | 0 | 0 | undet. |
| | $t_s$ s | 10.8 | 13.8 | 53.4 | undet. |
| Compen-sated | $M_p$ % | 0 | 0 | 0 | 0.3 |
| | $e_{ss}$ | 0 | 0 | 0 | 0 |
| | $t_s$ s | 10.8 | 14.1 | 22.2 | 32.1 |

(a) Performance of RCC (b) RCC with and without smooth handover

CONTROL SYSTEM AND METHOD FOR REMOTE CONTROL OF HARDWARE COMPONENTS

This is a National Phase Application under 35 USC 371 of PCT/EP2013/058792 filed Apr. 26, 2013 (published on Aug. 21, 2014 as WO 2014/124701); which claims priority to Great Britain Application No. 1302534.1 filed Feb. 13, 2013; all of which are incorporated by reference herein in their entirety.

The present invention relates to a control system and method and more particularly relates to a control system and method for use with cloud-based servers.

Digital computers were first used in control systems around the year of 1960. Ever since then, the evolution of control systems has been associated with the advancement of computing devices. Nowadays, an automation system is a multi-tiered architecture entailing several hierarchical layers of computation and communication. The meaning of automation now goes beyond automatic control as automation provides other higher-level functions in addition to direct, automatic control, such as monitoring, supervisory control, alarm management, historization, plant-level management, and enterprise-level applications.

A large-scale automation project that uses existing technology is a very costly and time consuming endeavour. It requires a massive amount of hardware and software, in addition to substantial human engineering effort. The initial cost of the automation often adds up to tens of millions of dollars. In addition, switching to another automation provider is usually avoided due to the great investment in the existing automation system. Apart from the cost, re-deploying a whole automation system is extremely tedious, especially for those running plants.

The present invention seeks to provide an improved control system and method.

According to one aspect of the present invention, there is provided a control system comprising a first hardware component, a second hardware component, a server which is remote from the hardware components, wherein the hardware components are in communication with the server so that data can be communicated between the hardware components and the server, and a primary control module which is implemented as a service running on the server, the primary control module being operable to communicate with the hardware components to control at least one of the hardware components.

Preferably, one of the hardware components is a sensor.

Conveniently, one of the hardware components is an actuator.

Advantageously, the first and second hardware components are integrated in a single hardware unit.

Preferably, the primary control module forms part of a direct control layer in the control system.

Conveniently, the primary control module comprises an algorithm which runs on the server as a service.

Advantageously, the hardware components communicate with the server using a field-level protocol running on top of a transmission control protocol (TCP).

Preferably, the hardware components communicate with the server using a protocol selected from a group consisting of Modbus/TCP and Profibus/TCP.

Conveniently, the hardware components communicate with the server via the Internet.

Advantageously, the server is a server which forms part of the cloud.

Preferably, at least one of the hardware components is connected directly to the cloud.

Conveniently, at least one of the hardware components is connected to the cloud via a local area network.

Advantageously, at least one of the hardware components is connected to the cloud via a gateway server.

Preferably, the gateway server is positioned in the same building as the hardware components.

Conveniently, the system further comprises a user interface which is in communication with the server to enable a user to interact with the server to monitor and control the primary control module.

Advantageously, the user interface is implemented as a platform as a service (PaaS) or a system as a service (SaaS).

Preferably, the hardware components output a process variable and the system comprises a feedback loop which communicates the process variable to an input of the primary control module, wherein the system further comprises a delay compensator module which modifies the process variable by a delay compensation value to compensate for a delay in the communication between the primary control module and the hardware components.

Conveniently, the system further comprises a comparator unit which incorporates a first input which receives the process variable and a second input which receives a reference value, wherein the comparator unit compares the process variable with the reference value and outputs a comparison value to an input of the primary control module, and wherein the delay compensator module modifies the process variable or an error value by the delay compensation value.

Advantageously, the delay compensator module selects the delay compensation value to correspond with the roundtrip time delay in communication between the primary control module and at least one of the hardware components.

Preferably, the delay compensator module selects the delay compensation value to be equal to the roundtrip time delay in communication between the primary control module and at least one of the hardware components.

Conveniently, the delay compensation module is a Smith Predictor.

Advantageously, the Smith Predictor modifies a process error instead of the process variable by a delay compensation value to compensate for a delay in the communication between the primary control module and the hardware components.

Preferably, the system further comprises a delay estimator module which is operable to estimate the roundtrip time delay in the communication between the primary control module and at least one of the hardware components.

Conveniently, the delay estimator module estimates the delay using an exponential weighted moving average calculation.

Advantageously, the delay estimator module estimates the delay variance using an exponential weighted moving variance calculation.

Preferably, the delay compensator module modifies the process variable gradually over a predetermined period of time.

Conveniently, the system further comprises a secondary control module which is implemented as a service running on the server, the secondary control module being operable to communicate with the hardware components to control at least one of the hardware components, wherein each control module is configured to operate in a standby mode in which it does not send control actions to the hardware components and in an engaged mode in which it sends control actions to the hardware components, wherein each control module is operable to communicate to check the operating mode of the other control module, and wherein one control module is operable to switch to the engaged mode if the other control module is not operating in the engaged mode.

Advantageously, upon initialisation of the system, the primary control module operates in the engaged mode and the secondary control module operates in the standby mode.

Preferably, the system comprises an input/output (I/O) interface and each control module is connected to communicate with the I/O interface.

Conveniently, the I/O interface incorporates a time recordal module which is operable to record a time value indicative of the time since each control module was last engaged and communicated control data to at least one of the hardware components.

Advantageously, each control module is operable to poll the I/O interface for a predetermined sampling period to determine the time value recorded by the time recordal module of the other control module.

Preferably, the primary control module is allocated a first ID number and the secondary control module is allocated a second ID number which is greater that the first ID number.

Conveniently, the control module with the lowest ID number is configured to operate in the engaged mode.

Advantageously, the system further comprises at least one further control module which is implemented as a service running on the server, each further control module being operable to communicate with the hardware components to control at least one of the hardware components, wherein each further control module is configured to operate in a standby mode in which it does not send control actions to the hardware components and in an engaged mode in which it sends control actions to the hardware components, wherein each further control module is operable to communicate with the I/O interface to determine the operating mode of the other control modules.

Preferably, at least one control module is implemented as a service running on a different server to at least one of the other control modules.

Conveniently, the servers are at different geographic locations to one another.

Advantageously, each control module incorporates an integrator and each control module is operable to communicate the value of its integrator to the other control modules, wherein each control module operating in the standby mode is configured to set its integrator value to correspond with the integrator value of the control module operating in the engaged mode so that each control module operating in the standby mode is ready to switch smoothly to the engaged mode.

Preferably, each control module is a proportional-integral-derivative (PID) controller.

Conveniently, each control module operating in the standby mode is operable to set its set point to the same value as the set point of the control module operating in the engaged mode.

Advantageously, the primary control module is implemented as a service running in a virtual machine which is running on the server.

Preferably, each other control module is implemented as a service running in the virtual machine which is running on the server.

Conveniently, each other control module is implemented as a service running in a respective separate virtual machine which is running on the server.

Advantageously, each other control module is implemented as a service running in a separate virtual machine which is running on one or more separate servers.

Preferably, each server is located at a different geographic location to the other servers.

According to another aspect of the present invention, there is provided a method of controlling a first hardware component and a second hardware component, the method comprising running a primary control module as a service on a server which is remote from the hardware components, the hardware components being in communication with the server, and controlling at least one of the hardware components using the primary control module by communicating data between the hardware components and the primary control module.

Preferably, one of the hardware components is a sensor.

Conveniently, one of the hardware components is an actuator.

Advantageously, the first and second hardware components are integrated in a single hardware unit.

Preferably, the primary control module forms part of a direct control layer in a control system.

Conveniently, the primary control module comprises an algorithm which runs on the server as a service.

Advantageously, the hardware components communicate with the server using a field-level protocol running on top of a transmission control protocol (TCP).

Preferably, the hardware components communicate with the server using a protocol selected from a group consisting of Modbus/TCP and Profibus/TCP.

Conveniently, the hardware components communicate with the server via the Internet.

Advantageously, the server is a server which forms part of the cloud.

Preferably, at least one of the hardware components is connected directly to the cloud.

Conveniently, at least one of the hardware components is connected to the cloud via a local area network.

Advantageously, at least one of the hardware components is connected to the cloud via a gateway server.

Preferably, the gateway server is positioned in the same building as the hardware components.

Conveniently, the method further comprises providing a user interface which is in communication with the server, and using the user interface to interact with the server to monitor and control the primary control module.

Advantageously, the user interface is implemented as a platform as a service (PaaS) or a system as a service (SaaS).

Preferably, the hardware components output a process variable and the method comprises communicating the process variable via a feedback loop to an input of the primary control module, wherein the method further comprises modifying the process variable by a delay compensation value to compensate for a delay in the communication between the primary control module and the hardware components.

Conveniently, the method further comprises comparing the process variable with the reference value and outputting a comparison value to an input of the primary control module, and modifying the process variable or an error value by the delay compensation value.

Advantageously, the method comprises selecting the delay compensation value to correspond with the roundtrip time delay in communication between the primary control module and at least one of the hardware components.

Preferably, the method comprises selecting the delay compensation value to be equal to the roundtrip time delay in communication between the primary control module and at least one of the hardware components.

Conveniently, the method comprises using a Smith Predictor to modify the process variable.

Advantageously, the method comprises using the Smith Predictor to modify a process error instead of the process variable by a delay compensation value to compensate for a delay in the communication between the primary control module and the hardware components.

Preferably, the method further comprises estimating the time delay in the roundtrip communication between the primary control module and at least one of the hardware components.

Conveniently, the method comprises estimating the delay using an exponential weighted moving average calculation.

Advantageously, the method comprises estimating the delay variance using an exponential weighted moving variance calculation.

Preferably, the method comprises modifying the process variable gradually over a predetermined period of time.

Conveniently, the method further comprises running a secondary control module as a service on the server, the hardware components being in communication with the server, and wherein each control module is configured to operate in a standby mode in which it does not send control actions to the hardware components and in an engaged mode in which it sends control actions to the hardware components, wherein the method comprises activating each control module to check the operating mode of the other control module, and wherein the method comprises switching one control module to the engaged mode if the other control module is not operating in the engaged mode.

Advantageously, initially the method operates the primary control module in the engaged mode and the secondary control module operates in the standby mode.

Preferably, each control module communicates with an I/O interface.

Conveniently, the I/O interface incorporates a time recordal module which is operable to record a time value indicative of the time since each control module was last engaged and communicated control data to at least one of the hardware components.

Advantageously, each control module polls the I/O interface for a predetermined sampling period to determine the time value recorded by the time recordal module of the other control module.

Preferably, the method comprises allocating the primary control module a first ID number and allocating the secondary control module a second ID number which is greater that the first ID number.

Conveniently, the method comprises operating the control module with the lowest ID number in the engaged mode.

Advantageously, the method further comprises running at least one further control module as a service on the server, each further control module being in communication with the hardware components, wherein each further control module is configured to operate in a standby mode in which it does not send control actions to the hardware components and in an engaged mode in which it sends control actions to the hardware components, wherein the method comprises operating each further control module to communicate with the I/O interface to determine the operating mode of the other control modules.

Preferably, at least one control module is implemented as a service running on a different server to at least one of the other control modules.

Conveniently, the servers are at different geographic locations to one another.

Advantageously, each control module incorporates an integrator and the method comprises communicating the value of the integrator of each control module to the other control modules, wherein the method comprises setting the integrator of each control module operating in the standby mode to correspond with the integrator value of the control module operating in the engaged mode so that each control module operating in the standby mode is ready to switch smoothly to the engaged mode.

Preferably, each control module is a proportional-integral-derivative (PID) controller.

Conveniently, the method comprises setting the set point of each control module operating in the standby mode to the same value as the set point of the control module operating in the engaged mode.

Advantageously, the primary control module is implemented as a service running in a virtual machine which is running on the server.

Preferably, each other control module is implemented as a service running in the virtual machine which is running on the server.

Conveniently, each other control module is implemented as a service running in a respective separate virtual machine which is running on the server.

Advantageously, each other control module is implemented as a service running in a separate virtual machine which is running on one or more separate servers.

Preferably, each server is located at a different geographic location to the other servers.

Figure 2:
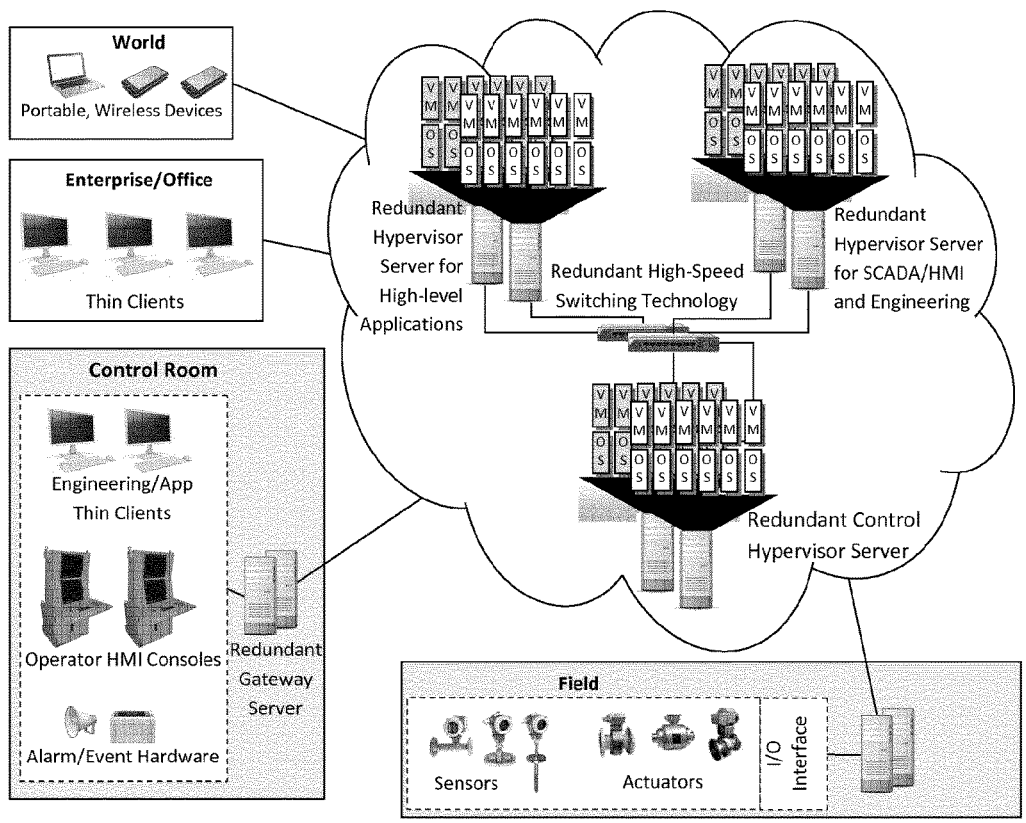
Figure 4A:
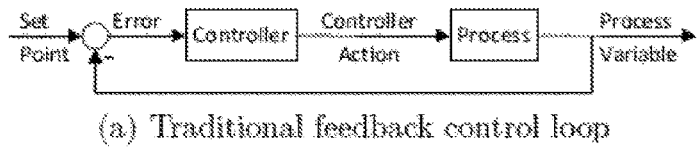
Figure 4B:
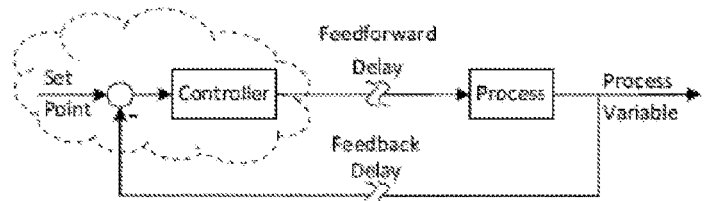
Figure 4C:
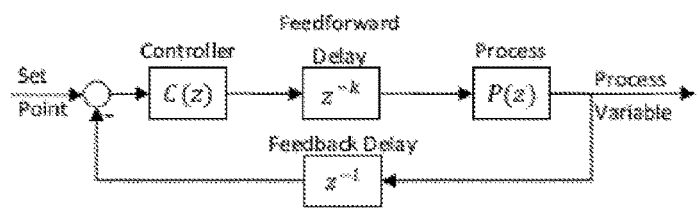
Figure 4D:
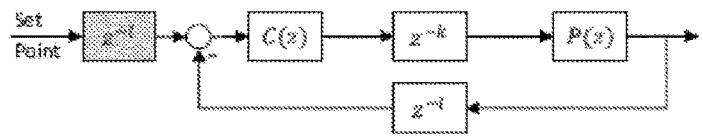
Figure 4E:
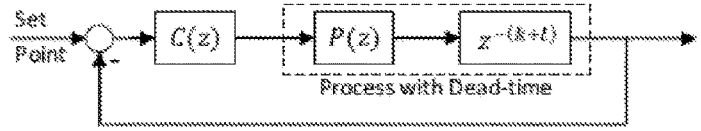
Figure 5:
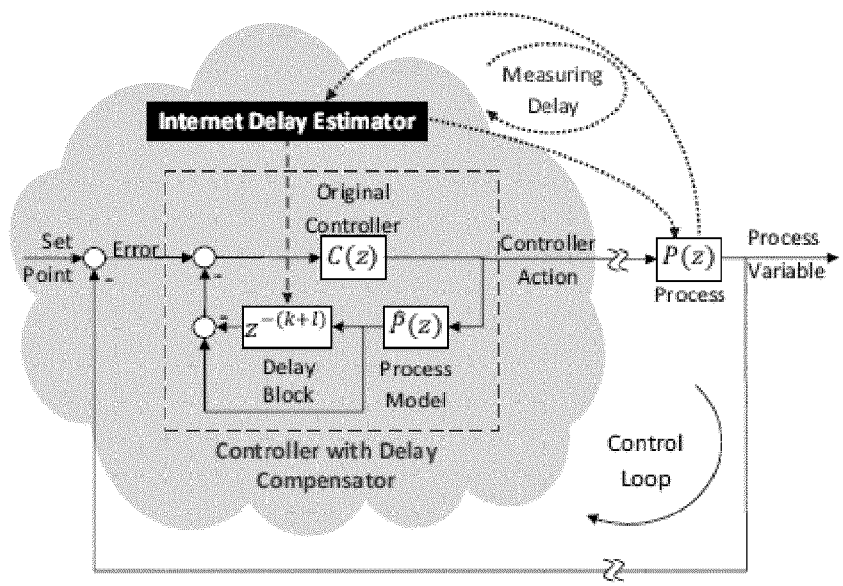
Figure 6:
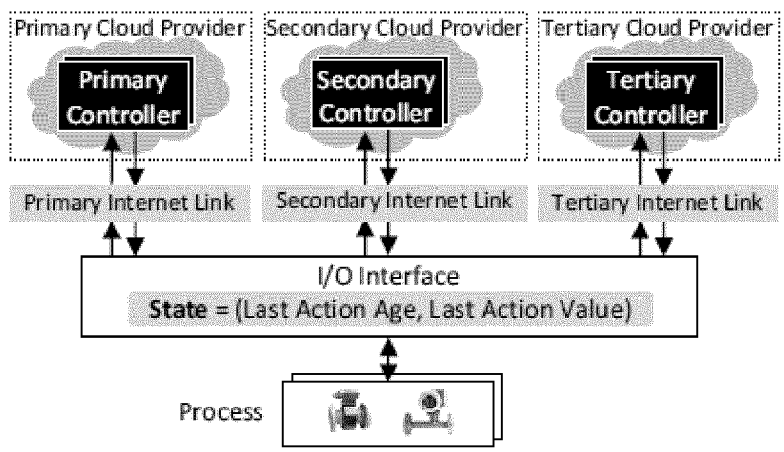
Figure 9:
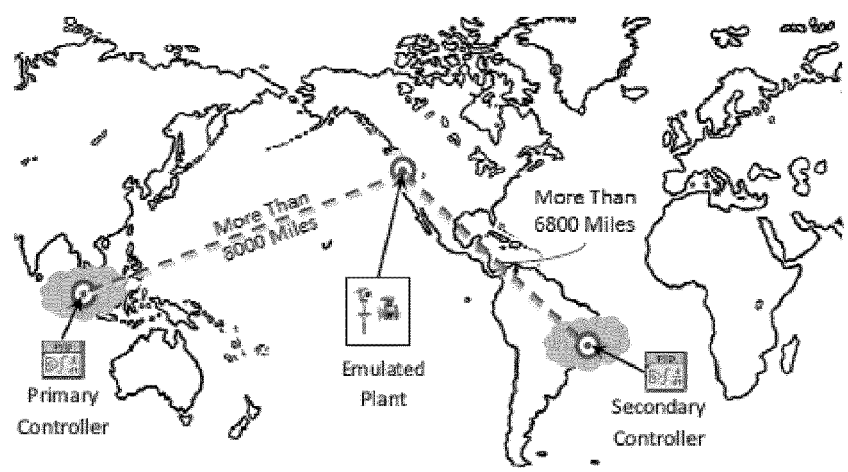
Figure 10:
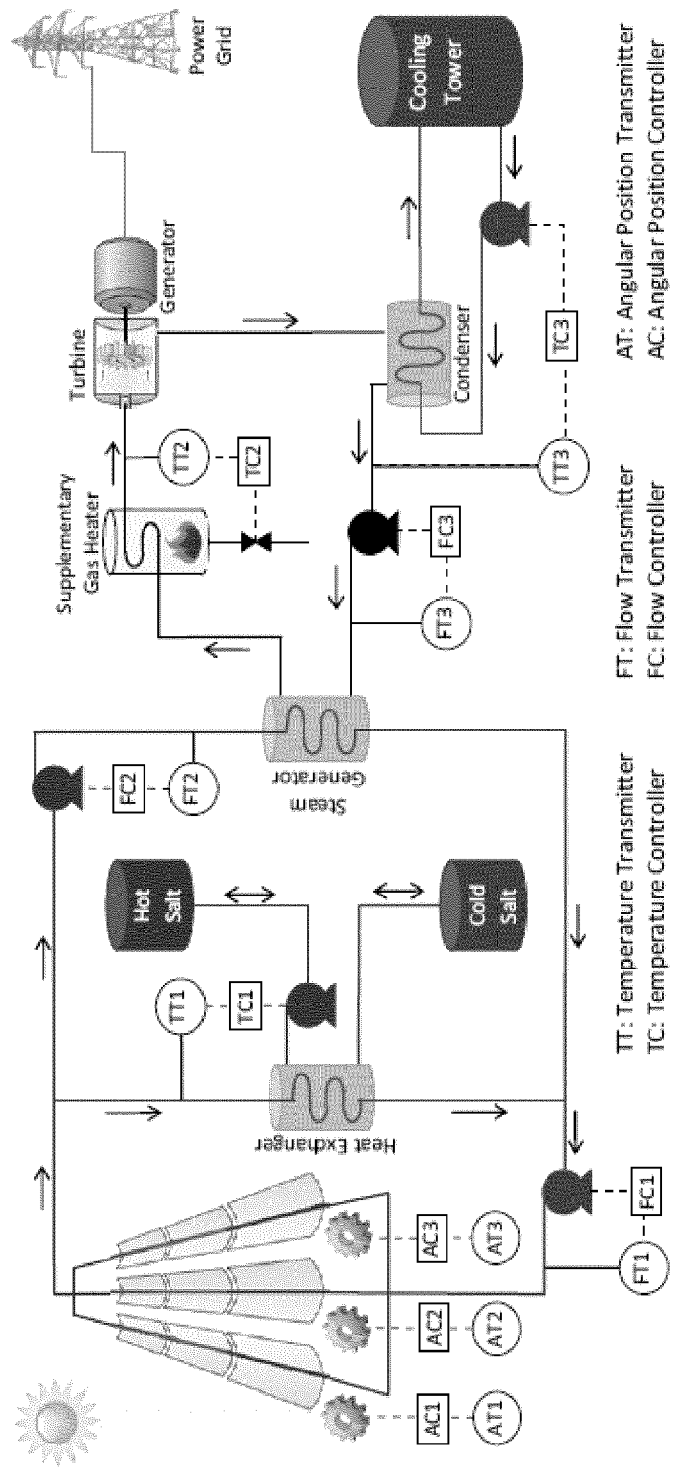
Figure 11:
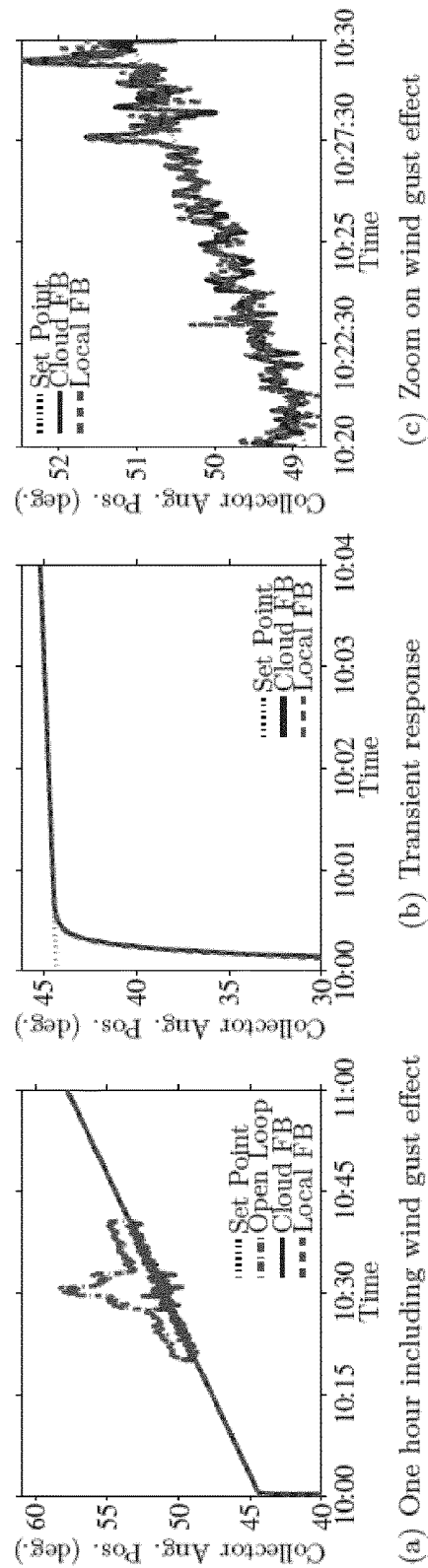
Figure 12:
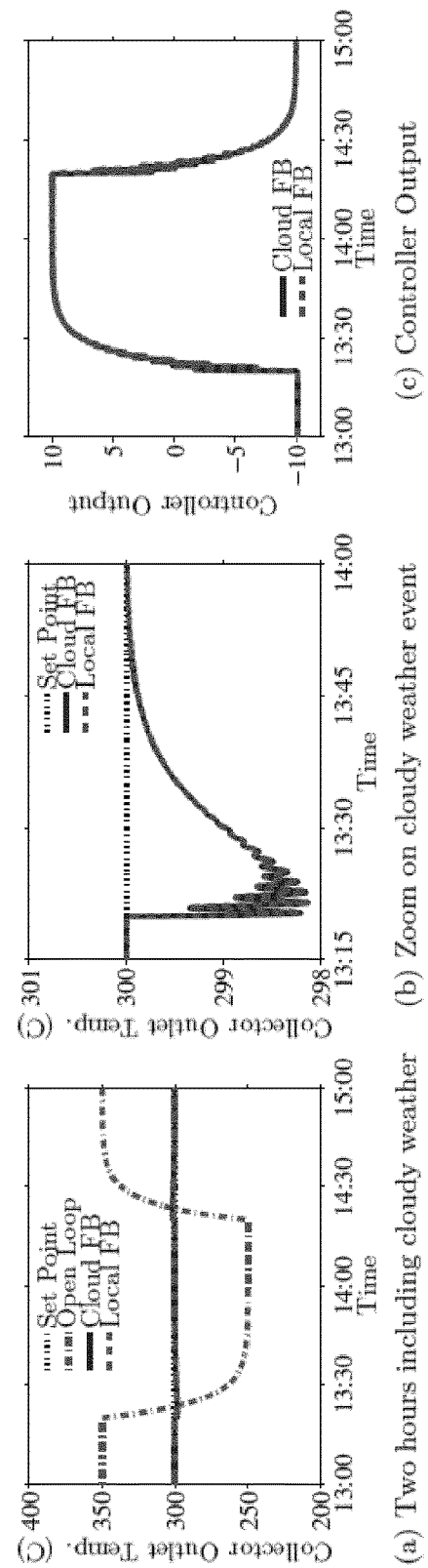
Figure 13:
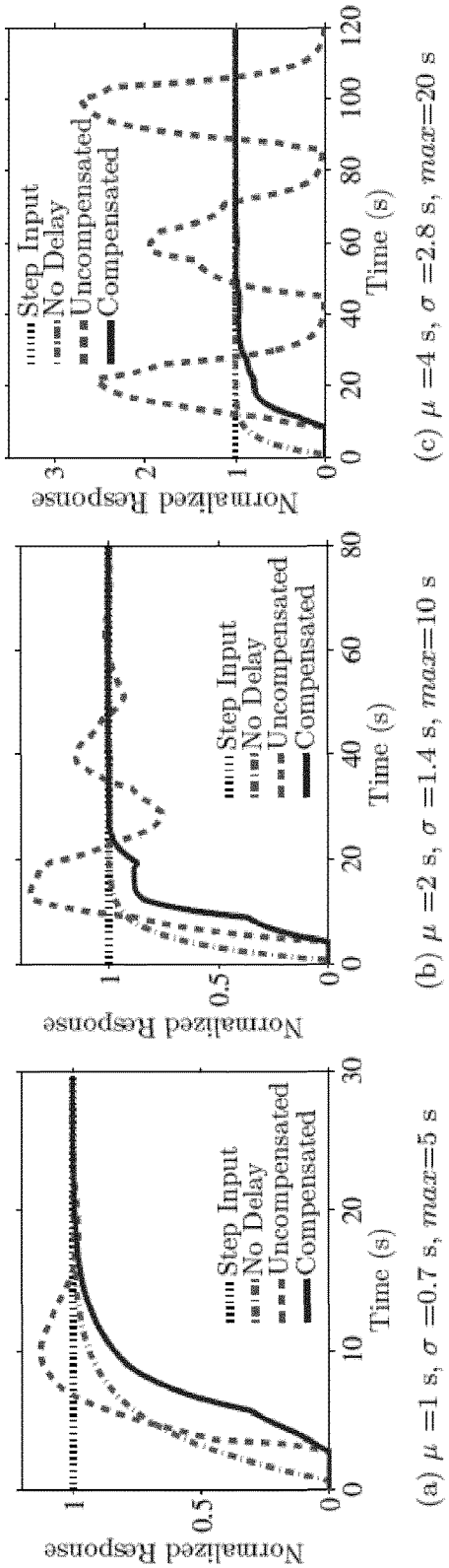
Figures 14, 15:
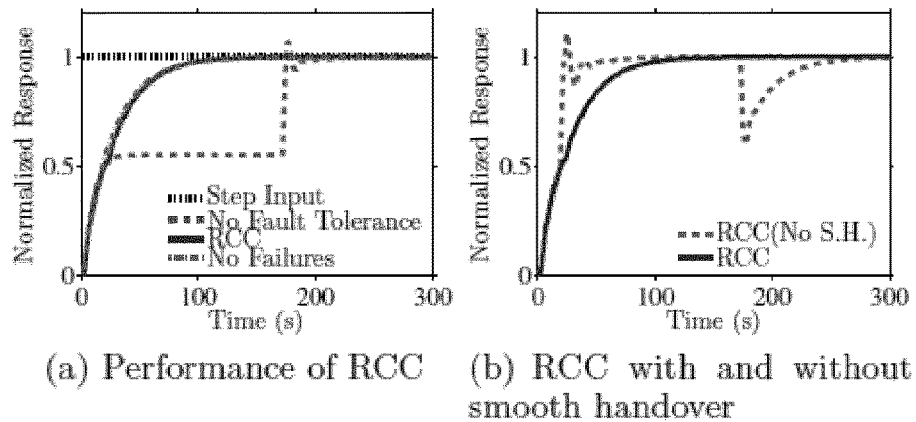

In order that the invention may be more readily understood, and so that further features thereof may be appreciated, embodiments of the invention will now be described, by way of example, with reference to the accompanying drawings in which:

FIG. 1 is a schematic diagram showing a conventional industrial automation system, FIG. 2 is a schematic diagram showing elements of a cloud-based control system of an embodiment of the invention, FIG. 3 shows the pseudocode of an algorithm for allocating controllers to virtual machines, FIGS. 4(a)-(e) show feedback control loops to mitigate internet delay in an embodiment of the invention, FIG. 5 is a schematic diagram of a cloud-based control system of an embodiment of the invention, FIG. 6 is a schematic diagram showing a plurality of cloud-based controllers running as services on systems provided three separate cloud providers, FIG. 7 shows the pseudocode of a reliable cloud control (RCC) algorithm of an embodiment of the invention, FIG. 8 shows the pseudocode of a smooth-handover algorithm of an embodiment of the invention, FIG. 9 is a schematic diagram showing the position of two cloud controllers during the testing of an embodiment of the invention, FIG. 10 is a schematic diagram of a solar power plant control system, whose emulation was used in testing embodiments of the invention, FIGS. 11(a)-(c) show plots of the solar collector angle during testing of an embodiment of the invention, FIGS. 12(a)-(c) are graphs plotting the results of the control of the solar power plants during testing of an embodiment of the invention, FIGS. 13(a)-(c) are graphs showing the results of testing the control system of an embodiment of the invention when delays are introduced, FIG. 14 is a table summarising the performance metrics using the delay compensator of an embodiment of the invention, and FIGS. 15(a)-(b) are graphs showing the performance of the RCC algorithm with and without smooth handover.

An embodiment of the invention uses automation in its broad sense to propose a cloud-based automation approach. An example of industrial automation is detailed below to demonstrate the feasibility of an embodiment of the invention. The architecture and the functions of an automation system are defined. The continuous, regulatory, industrial processes which are used in the implementation and evaluation of an embodiment of the invention are then defined. The meaning of automation goes beyond the definition of automatic control. Automation refers to a whole architecture that provides several functions on top of the direct, automatic control.

Automation has several application areas, including industrial automation, building automation, highway automation, and home automation. At the lowest layer of the architecture, sensors are deployed to measure the quantities that need to be controlled (called process variables). Actuators are used to drive the process variables to their desired values. Examples of process variables include building temperature, highway traffic speed, and industrial boiler pressure. Moving up one level, a direct controller takes sensor measurement of the process variables as an input, computes the necessary action, and outputs its action to the actuators. On top of direct control, users need higher-level control-related functions, such as monitoring for users to be able to conveniently watch the process variables, supervisory control to configure direct controllers, and historization to log different variables in a database. Higher-level optimization for and enterprise-level management are required for complex automation applications.

Industrial automation is one of the most complicated architectures. FIG. 1 illustrates a simplified, conventional industrial automation system architecture. The system is divided hierarchically into several layers. First, field devices are the sensors and the actuators mounted in the plant to monitor and control the plant process variables. For medium and large-scale plants with a large I/O count, a field-level network is used to provide better data communication and wiring management at the level of sensors and actuators. Data is transferred back and forth from/to the field devices to the controllers which are located in a control room. Second, controllers are microprocessors that run special purpose software blocks performing all the necessary control computations, such as direct continuous or discrete control, safety and emergency shutdown. A single controller can usually process several control loops, depending on the processors speed and the sampling rates and complexity of the control loops.

Third, on top of the controllers comes the human-machine interface (HMI) and the supervisory control and data acquisition (SCADA). In addition to HMI/SCADA stations, other applications such as historian, alarm manager and many others are run on dedicated workstations. Furthermore, any necessary changes to control strategies are implemented on and then deployed from engineering workstations. All such computers are connected to the controllers through a control network.

Fourth, higher-level plant optimization performs advanced calculations to provide decision support on optimal plant operation parameters for optimizing certain objectives such as energy consumption, production rate, or production quality. Plant-level optimization workstations and servers are connected to the HMI/SCADA level through a dedicated network called plant network. Finally, enterprise-level management performs several functions, such as asset management and accounting. Plant optimization objectives are decided based on the analysis performed at the enterprise level.

An industrial process takes in raw material and energy as input and creates a product or a set of products. Based on several factors including the type of raw material and the flow of material, industrial processes can be classified into three main classes: continuous, batch and discrete. Industrial plants are composed of several industrial processes. Plants are classified based on the predominant type of its processes. For example, a plant that is composed of mostly continuous processes is classified as a continuous plant. Generally speaking, there are no clear-cut boundaries between the three classes, but classification helps understand the requirements of each process and how to control them.

Oil refineries, electrical power stations, and nuclear reactors are all examples of continuous processes. They all have several characteristics in common. First, the raw material is usually of a fluid type, such as oil, water, and natural gas. Second, the flow of material may vary in rate but is always continuous to meet continuous demand. Third, a continuous process typically runs for a very long and undetermined time. Fourth, process shutdown is highly undesirable because of the incurred cost and loss of material. It could take a very long transient time, e.g., hours or days for the process to reach steady state and produce a useful product. During this transient time, all the material and energy are wasted.

Food industry is an example where batch processes are heavily employed whereas automotive industry is an example where discrete processes take place. Material flow in both cases is generally discontinuous. Also, both types are generally assembly-oriented. However, generally speaking, the products of batch processes are impossible to be disassembled back to their original ingredients, while the products of discrete processes can be disassembled to the original components. The materials used in batch processes are a mix of fluid and dry materials whereas discrete processes typically process solid parts. Unlike continuous processes, both batch and discrete processes do come to an end. In batch processes, this happens according to timeout or an end condition, e.g., bread is baked for one hour or until light brown surface is reached. In discrete processes, the process ends when the product is finished, e.g., a car has been fully assembled.

Continuous industrial processes are often considered to be the most high-risk and high-impact processes. They require continuous monitoring and control for very lengthy periods of times. Consider an electrical power station for example. Poor performance due to poor control leads to great losses in terms of money, material, and energy. Further, safety hazards associated with such processes could be severe and can easily cause multiple life losses in a single incident.

In one embodiment of the invention, feedback control is implemented as a cloud service that has two components: (i) cloud controllers and (ii) a control input/output (I/O) interface. The controllers are software modules implementing modified versions of standard controllers, such as Proportional Integral Derivative (PID) controllers. The modifications are done to handle Internet delays, packet losses, and failures, and to ensure that the control theoretic performance guarantees are achieved. In one embodiment, the controllers are deployed on virtual machines (VMs) and multiple controllers can run on the same VM. The control I/O interface is located at the controlled system side. The control I/O interface communicates with the cloud controllers by receiving control actions and sending current process status. Control actions are then relayed to actuators of the controlled system, while the current status is updated by various sensors.

A networked control system can be considered as a version of a distributed control system, where general-purpose communication networks (intranet and Internet) are used in addition to or instead of the dedicated field-level network to transport process and control data. If the communication network is the Internet, the control system is referred to as Internet-based control system. Internet-based control systems are considered to be a special case of networked control systems. While typical distributed control systems offer reliable communication with deterministic delays through a dedicated network, networked control systems suffer delay uncertainties and less reliable communication.

Delay compensators may be provided to overcome network delays. In most cases, two compensators are required to compensate for the delay in the forward and the feedback paths. For example, two predictive compensators may be provided to compensate for Internet delays in the feedforward and feedback directions of an Internet-based control system. The compensators are shown to successfully mitigate the effect of random delay in both simulation and a real liquid level regulation process controlled from a remote controller over the Internet. Similarly, delay compensation may be provided through a buffer in the actuator node and a state estimator in the predictive controller node. The controller sends control actions for several sampling periods.

Two-component compensation methods such as this mitigate the delay effect and provide a stable control system. Adopting such approaches in commercial systems is, however, problematic for several reasons. First, such approaches are not supported by existing commercial controllers. Second, implementing two-component compensators requires extra hardware and/or software. Although such support can be provided for the controller-side component at zero or minimal cost, this is not the case for the process-side component which typically lacks processing power. Third, for cloud-based controllers, computing functions must be moved to the cloud, a requirements that conflicts with the design of these compensators. In an embodiment of the invention, a single-component compensator is hosted in the cloud to compensate for the whole round-trip delay. The compensator can be implemented using the features available in today's commercial, off-the-shelf controllers which maximize its potential.

1.1 All-in-the-Cloud Automation System

In one embodiment of the invention, all computing functions of the automation system are moved into the cloud in order to provide full automation as a service. There are certain hardware components that cannot be moved to the cloud, such as sensors, actuators, and safety/emergency shutdown control functions. FIG. 2 illustrates an example of an automation architecture. The following description describes how this architecture achieves all automation functions in all levels, and highlights the key differences between this architecture and the existing automation systems depicted in FIG. 1.

Starting first at the field (lowest) level, the sensors and actuators are connected to the cloud, using field-level protocols that run on top of TCP, such as Modbus/TCP and Profibus/TCP.

In one embodiment, all or at least one of the hardware components are connected directly to the cloud. In another embodiment, all or at least one of the hardware components are connected to the cloud via a local area network.

In a further embodiment, all or at least one of the hardware components are connected to the cloud via a communications server. In one embodiment, the communications server is positioned in the vicinity or location of the hardware components and is preferably in the same building as the hardware components.

In cases where advanced functions, such as security and message-level scheduling are required, a gateway server is dedicated for this purpose. Further, for more reliability, we replicate gateway servers, such that in the event of primary server failure, the secondary server takes over in a stateful manner.

Second, for the direct control layer, the control algorithms are run as a cloud service. In existing automation systems (FIG. 1), controllers poll sensors and send commands to actuators over a LAN. Conversely, in an embodiment of the invention, communication occurs over the Internet. Also, in existing systems, a control algorithm runs on real hardware, enclosed in a cabinet in the control room. In an embodiment of the invention, however, controllers are run over virtual machines (VMs) because virtualization offers more flexibility and reduction of cost/time. Running the control algorithms in the cloud requires communication over the Internet which introduces two new challenges: Internet delay and service failure because of VM crashes or link failures. New algorithms to address these challenges are described below in Sections 2.2 and 2.3.

Third, for supervisory control, human-machine interface, and other control room applications, in one embodiment these applications are provided through Platform and Software as a Service (PaaS and SaaS) models. Thus, engineers and operators are provided with access to the control room applications through thin clients. In existing automation systems (FIG. 1), a control room is a complex environment loaded with servers, workstations, network switches, and cables. However, in an embodiment of the invention, a control room is a much cleaner environment comprised of a number of thin clients running on much simpler hardware, with all complex hardware moved to the cloud. Consequently, control room hardware and software deployment becomes much easier and less costly. The demanding tasks of infrastructure/application deployment, maintenance and upgrade are no longer a burden on the engineers and operators. As a result, they can focus on the automation functions. Finally, in a manner similar to the field gateway server, a control room redundant gateway server is proposed to reliably carry on advanced functions, such as security and message scheduling.

Fourth, for the plant-level optimization and enterprise-level management, one embodiment utilizes the SaaS model. Unlike the direct and supervisory control layers, plant-level optimization and enterprise-level management applications are less challenging to move to the cloud as their timeliness and reliability requirements are less tight than lower levels. For example, an enterprise office may well tolerate Internet service outage for several minutes, or even hours. On the other hand, seconds-long Internet failure for a cloud-based industrial controller means leaving the physical process uncontrolled for several scan periods, which may lead to high safety risks.

High-level organization of the data centre inside the cloud is shown in FIG. 2, where a number of servers run virtual machines to handle all levels of automation. Applications belonging to each automation layer are grouped to run on the same cloud server(s). While this is not a strict requirement, it is recommended because it enables better data centre organization. For example, assume the timeliness requirements for the direct control level is so strict to the point that controllers need to run on top of a real-time operating system. In this case it is better to bring all controllers together on the same server or group of servers with real-time operating systems. Mixing application types, may lead to difficult and/or poor data centre management. Communication among servers are handled using high-speed switching technology, which replaces the four networks employed by existing systems shown in FIG. 1. In an embodiment of the invention, time, effort, and cost involved in deploying, wiring, maintaining, and upgrading the communication infrastructure are reduced.

A service interface is provided for users to select, allocate, and manage resources through intelligent decision support. The interface is not shown in FIG. 2.

An embodiment of the invention moves some or preferably the entire computing and communication infrastructure required by an automation system into the cloud. This makes it easier and less costly for users to deploy, maintain, and upgrade their automation systems. Moreover, an embodiment of the invention supports switching to different cloud automation providers since all virtual machines can be group-migrated to a different provider.

An embodiment of the invention incorporates a method comprising the following steps which determine the allocation of controllers to virtual machines (VMs):

1) Determine the CPU utilization $u_i$ and bandwidth profile $b_i$ for each application by running the application on a VM and measuring consumed bandwidth and CPU utilization.
2) Determine the maximum bandwidth $B_k$ and CPU utilization $U_k$ that can be offered by a VM $V_k$.
3) Determine the controller allocation based on the allocation algorithm shown in FIG. 3. After running the allocation algorithm, $S_k$ will contain the controllers assigned to VM $V_k$.

The allocation algorithm shown in FIG. 3 can be summarized as: For each application, scan all available VMs and assign the application to the first available VM that can accommodate the CPU utilization based on a schedulability test (e.g., rate monotonic), and can accommodate the maximum bandwidth required by the application. When an application has been assigned to a VM, the loading (CPU and bandwidth) of the VM is updated.

The main routine of the allocation algorithm shown in FIG. 3 is run initially to allocate VM resources to controllers. If a new controller is to be launched in runtime, the allocate( ) routine is called for the new controller and the allocations $S_k$.

1.2 Mitigating Internet Delay

An embodiment of the invention provides a method and system to handle Internet delays introduced by moving the controllers to the cloud. A traditional feedback control loop shown in FIG. 4(a). The controlled process has an input and an output, called process variable. The process variable is fed back to be compared with the desired value, also called reference value or set point. The difference between the set point and the process variable is called error. The controller takes the error as input and computes the necessary controller action to correct the error.

Now that the controller has been moved to the cloud, as shown in FIG. 4(b), the Internet comes between the process and the controller, which affects the loop in both directions. First, the controller action reaches the process after a time delay called feedforward delay. Second, the process variable reaches the cloud-based controller after a time delay called feedback delay. The loop can be modelled as shown in FIG. 4(c), where P(z) is the process transfer function, C(z) is the controller transfer function, and $z^{-k}$ and $z^{-l}$ denote the delays on the feedforward and feedback paths, respectively.

An embodiment of the invention introduces an artificial delay block at the entrance of the set point as shown in FIG. 4(d). The significance of introducing such delay is discussed at the end of this subsection. The amount of delay introduced is equal to that of the feedback path, $z^{-l}$. With simple block diagram algebra, the loop can be simplified as shown in FIG. 4(e). Now, the cloud-based control problem is reduced to what is known in control theory as controlling processes with dead-time or transport lag.

A process with dead-time is a process with inherent delay, such that there is a time delay between the application of the input and its effect on the output. Such inherent delay is usually encountered when material traverses along path within the process (e.g., over a conveyor belt or a long pipe) between the actuator and the sensor. Consider, for example, a paper machine where fibers, water, and additives such as filler, sizing, dye, and resins are all mixed at beginning of the process. Then, the long produced paper sheet is mechanically pulled through a long path until it is drained, dried and ready to be measured at the far end of the process. The sensor measurement is used to control the material mix prepared at the beginning of the process. The long time between applying the mix and measuring it is the dead-time for this process.

To control processes with dead-time more effectively, the controller is usually coupled with a delay compensator. Several delay compensators have been proposed for this purpose. One embodiment uses a Smith Predictor since it is one of the most widely used compensators as it comes with most commercial off-the-shelf controllers, e.g., Siemens PCS 7 and Invensys Foxboro I/A Series. Equally important, a Smith Predictor does not require precise knowledge of the delay component while designing the controller. First the controller is designed as if no delay is encountered. Then, the delay is measured to adjust the Smith Predictor. This is useful when designing cloud-based controllers because Internet delay changes dynamically and delays cannot be known ahead of time.

A controller with a standard Smith Predictor is derived as follows. Suppose the process consists of a non-delay component P(z) followed or preceded by a pure time delay $z^{-j}$. First consider the plant without a delay and design a controller C(z), the closed loop transfer function becomes $$T(z) = \frac{C(z)P(z)}{1 + C(z)P(z)}.$$

The objective is to find a controller $\overline{C}(z)$ for the plant $P(z)z^{-j}$, such that the closed loop performance $\overline{T}(z)=T(z)z^{-j}$, which involves solving the following equation for $\overline{C}(z)$:

$$\frac{\overline{C}(z)P(z)z^{-j}}{1+\overline{C}(z)P(z)z^{-j}} = \frac{z^{-j}C(z)P(z)}{1+C(z)P(z)} \quad \text{(Equation 1)}$$

The new controller is therefore given as:

$$\overline{C}(z) = \frac{C(z)}{1+(1-z^{-j})C(z)P(z)} \quad \text{(Equation 2)}$$

The proposed cloud controller is shown in FIG. 5. This figure shows two main components: (i) the controller with delay compensator and (ii) the Internet delay estimator. The controller with delay compensator is shown in the dashed box which is a block diagram of the controller described by Equation 3, but with the combined feedforward and feedback delays $z^{k+1}$, i.e., the roundtrip delay. It uses C(z) which is the original controller designed for the process P(z) with no delays. It also needs an approximation of the process which is denoted by $\hat{P}(z)$. In practice, a simple first or second-order approximation is sufficient. The second component is shown in the black box in FIG. 5, and it estimates the roundtrip delay between the process and the cloud where the controller resides. The roundtrip delay is used in the delay block $z^{k+1}$. A delay estimator of an embodiment of the invention employs an exponential weighted moving average (EWMA) to estimate Internet delay as $D_i = \alpha d_i + (1-\alpha) D_{i-1}$, where $D_i$ is the estimated mean delay and $d_i$ is the measured delay at discrete time instant i. Similarly, an embodiment of the invention employs an exponentially weighted moving variance (EWMV) to estimate the delay variance as $V_i = \alpha (d_i - D_i)^2 + (1-\alpha) V_{i-1}$, where $V_i$ is the estimated variance at discrete time instant i. The delay value in the delay block is adjusted to $$D_c = \left\lceil \left(D_i + nV_i^{\frac{1}{2}}\right) / T_s \right\rceil, \quad \text{(Equation 3)}$$

where $T_s$, and h is a positive parameter to accommodate for delay values larger than the mean. Thus, the estimator adjusts to changes of delay while not overreacting to short delay spikes.

Referring again to the delay block shown in FIG. 4(d), introducing such delay is insignificant to the operation of the system. First, for the majority of continuous control systems, set points are kept constant for extremely long periods if not for the entire system lifetime. A delayed version of such constant function is itself the same constant function. Second, in cases where a set point needs to be changed, set point change is often performed manually by a human operator. Adding a few tens/hundreds of milliseconds of delay is insignificant to the operator response (several seconds, to reach a knob or software slider and to up date the value). Even for cases where set point change is done automatically by supervisory control, set point values are usually kept constant for periods that are much longer than the Internet round trip delay. Third, for distributed control system applications where processes have a time constant of at least several seconds, introducing such set point delay will not introduce any practical performance issues. Finally, in totally different contexts, set point manipulation is in various situations other than delay mitigation. For example, set point ramping is performed to smooth and hence alleviate the undesirable effects of the abrupt point changes. Set point ramping introduces a transient period where set point changes from the old value to the new value in ramp fashion. Such set point ramping makes the new value effective after a certain time delay.

In summary, the adding a single artificial delay block transforms the challenging cloud control problem to a problem of controlling a process with dead-time. The latter has been solved by using Smith Predictors and used in practice for many decades. This enables controllers to be moved to the cloud without changing the design of the original controller or the process that is being controlled.

2. Handling Failures

This section describes a distributed fault tolerance algorithm which guarantees normal operation under controller failures, and the theoretical performance of the system is analyzed. This section also shows that for most real-life scenarios, cloud feedback control using the algorithm of an embodiment of the invention has virtually no effect on the controlled process operation.

In most practical systems, controller failures are handled by double redundancy, or at most triple redundancy for mission-critical processes. Upon failure, redundant controllers take over in a stateful manner, with the goal of making the controlled process unaware of the failure. Typically, redundant controllers are closely located and tightly synchronized. Thus, they easily share the control loop state with an update period that is normally in the order of tens of milliseconds through a direct link. Providing similar reliability from redundant cloud controllers is quite challenging because controllers would typically run on different machines and preferably in different data centers or even different cloud providers, through different Internet providers (multi-homing) as proposed in FIG. 6. Using different machines tolerates machine failures, whereas replicating across different data centers (or cloud providers) and using different Internet providers adds more robustness to situations such as Internet link failures. Additionally, fine-grained clock synchronization and maintaining the state consistency on short time scales are complex and costly for geographically distant machines communicating over the best-effort Internet.

To achieve reliability in the proposed feedback control cloud service, one embodiment of the invention incorporates a distributed fault tolerance algorithm that is run asynchronously by all redundant controllers. The algorithm is known as Reliable Cloud Control (RCC). RCC supports double or higher redundancy and provides the following guarantees:

G1: If the primary controller fails, the secondary controller is automatically hot-swapped in. This guarantee is generalizable to higher redundancy. For example, in the case of triple redundancy, if the primary and secondary controllers fail, the tertiary controller is hot-swapped in.

G2: If the failed primary controller recovers, it takes over, forcing the secondary controller out of action. This guarantee is desirable when the secondary VM and/or link are chosen to be of less quality than the primary for cost savings. This guarantee is also generalizable to higher redundancy.

G3: Handover of controllers is performed smoothly causing no undesirable transient response artifacts.

For RCC to provide such guarantees, the system state is defined as the tuple $(a, u_1, u_2, u_3, \ldots)$, where a is the last controller action executed by the actuator, and $u_i$ is the time elapsed since the last action performed by the redundant controller $C_i$. To be visible to all controllers, RCC stores the state tuple in the memory of the control I/O interface module as shown in FIG. 6. The state tuple is initialized when the I/O interface is first turned on. The last action a can be initialized arbitrarily according to the process design. The time since last action $u_i$ is initialized to ∞ to indicate that the controller $C_i$ has never acted.

At any given time, RCC makes a single controller engaged in controlling the process, while it makes the other controllers standby (or backup). A standby controller is still reading the process output and preparing, but withholding, its own next action. RCC runs three main steps on each controller in each sampling period: Polling, Computing, and Conditional Acting.

Polling:

Each controller polls the I/O interface for the state tuple along with the sensor measurement.

Computing:

Based on the state and the measurement, each redundant controller computes:

(i) The mode of the controller: engaged or standby, and (ii) Next own control action by running the core control algorithm.

Conditional Acting:

Based on the mode of the controller computed in the Computing step, each controller decides whether to send its action to the process or withhold it. The condition is used to coordinate the actions of the controllers, such that only one controller sends an action to the process and updates the process-maintained state tuple. All other controllers will withhold their actions.

In one embodiment, RCC does not require any clock synchronization. RCC is a periodic, soft real-time task whose relative deadline is equal to its sampling period. As a result, the core control algorithm is executed on every sampling period and is required to finish any time before the beginning of the next period. Delaying a control action within the same sampling period does not compromise the running control algorithm because the process will still be receiving one action per sampling period. For these two reasons, RCC can run asynchronously on all VMs, and backup controller(s) could be started any time after the primary is started, without having to synchronize the clocks of the VMs hosting the controllers.

2.1 Detailed Operation

FIG. 7 shows the pseudocode of RCC which runs on top of every controller. On the very first cycle, RCC initializes the ID i and the engagement threshold $D_i$ for controller $C_i$ to guarantee that only one controller is engaged at a time. IDs are set as 1 for the primary, 2 for the secondary, and so on. Also, for any controller pair $(C_i, C_j)$ where i>j, the engagement thresholds must satisfy $D_i > D_j \geq T_s$, where $T_s$ is the sampling period. Then, the main steps are executed with every sampling period. The Polling step fetches the following variables from the I/O interface:

(i) processVar: the current sensor measurement.

(ii) lastAction: representation of the state variable a, i.e., the last action executed by the actuator.

(iii) lastActionAge: a time counter array such that lastActionAge (i) represents the state variable $u_i$, i.e., the time elapsed since $C_i$ was last engaged.

If the Polling step times out, e.g., due to link failure, the controller skips the current sampling period after resetting its firstCycle flag to TRUE. This line in the pseudocode is relevant for guarantee G3 as will be shown below in Section 2.2.

Then, the Computing step decides the controller mode. For a given controller $C_i$, if there is another controller $C_j$ with a smaller ID that is alive, then $C_i$ will decide to run in the standby mode. On the other hand, for all $C_j$ where j<i, if the age of the last action $u_j$ is older than $D_j$, then $C_i$ will decide to run in the engaged mode as it assumes that all controllers $C_j$ have failed. Thus, RCC evaluates the flag iAmEngaged using the for loop scanning lastActionAge for controllers with lower IDs. Then, RCC runs the control algorithm controller( ), which normally requires the sensor measurement processVar only. Nevertheless, for some control algorithms, guarantee G3 dictates passing more parameters as discussed below in Section 2.2.

Finally, the Conditional Acting step sends the computed action to the process if the iAmEngaged flag is TRUE. It further sends zero to reset the counter indicating time since last action. Otherwise, if the iAmEngaged flag is FALSE, the step performs no actions.

Without loss of generality, we now focus on the triple redundancy case to illustrate the interaction among 3 controllers under RCC. The iAmEngaged flag of the primary controller is always TRUE since it has the smallest ID. As the secondary controller polls the time counter lastActionAge (1), it continuously checks whether the primary controller is alive. If the primary controller fails, the secondary controller will detect the failure when lastActionAge (1) exceeds the secondary's engagement threshold. In this case, iAmEngaged for the secondary controller will stay TRUE throughout the for loop. Thus, the secondary controller will run in the engaged mode and hence reset its lastActionAge (2) entry in the I/O interface to indicate it has just acted. Although the tertiary controller will also detect the failure of the primary, its engagement threshold is higher than that of the secondary controller. Before the value of lastActionAge (1) crosses the tertiary controller's engagement threshold, the secondary controller would have already acted. Thus, when the tertiary polls the state on the following sampling period, the time counter lastActionAge (2) would have incremented to δ, such that $0 \leq \delta \leq T_s$ which is less than the tertiary's engagement threshold, forcing iAmEngaged flag for the tertiary controller to become FALSE.

The tertiary controller will get engaged if and only if both the primary and secondary controllers become unavailable. This addresses guarantee G1 If the primary controller recovers from failure, it will gain control over the process since it always operates in the engaged mode, forcing the secondary controller into the standby mode. Upon resetting lastActionAge (1) for the primary controller, the secondary controller will detect the recent primary action whose age is less than the secondary's engagement threshold. As a result, the iAmEngaged flag for the secondary controller will be FALSE. Thus, the secondary controller will operate in the standby mode. The same discussion applies to any two controllers when the lower-ID controller recovers from failure. This achieves guarantee G2.

2.2 Smooth Controller Handover

Switching between controllers may result in a "bump" in the process output, which would violate guarantee G3. This occurs if the final value of the original controller action is not equal to the initial value of the new controller action. The main reason for this is that the redundant controllers do not necessarily start at the same time. With most controllers having an integrator component, the output of the controllers will not be the same since their integration intervals have different start times.

To achieve smooth handover between cloud controllers, an embodiment of the invention uses the bumpless transfer concept from control theory in the cloud controllers. Bumpless transfer is originally designed to support switching from "manual" to "auto" control, and it is supported by most commercial PID controllers, which constitute more than 90% of the controllers employed in the industry. Bumpless transfer for PID controllers is achievable through adjusting the initial value of the integrator. Other bumpless transfer methods have been proposed for advanced "auto" controllers.

FIG. 8 shows the smooth-handover version of the PID controller( ) function introduced in FIG. 7 that guarantees smooth handover when switching between two or more PID controllers. The algorithm also works when switching from any controller to a PID controller.

The pseudocode shown in FIG. 8 focuses on the modification required to add the smooth handover feature to a standard PID control algorithm. Almost all commercial PID controllers provide support for implementing this modification. Although such support is provided for a different problem, it can also provide smooth handover for cloud controllers of embodiments of the invention.

Assume, for example, that there are two PID controllers: $C_i$ in the engaged mode, and $C_j$ in the standby mode. Except for the first sampling period, the engaged controller $C_i$ runs the PID control algorithm without applying the modification because it skips the statement under if. On the other hand, the standby controller $C_j$ overrides the regular value of the PID integrator by forcing it to be equal to the last control action (which is computed by the engaged controller, $C_i$), after subtracting the proportional action (P) and the derivative action (D) of the PID algorithm. This step corrects any deviation of the integrator of $C_j$ so it matches the integrator of $C_i$. As a result, the output of $C_j$ will always be equal to the output of $C_i$. Under this condition, if $C_i$ fails, and $C_j$ takes over, then $C_j$ starts with an action that is equal to the last action of $C_i$.

Any controller is required to correct the initial value of its integrator on its initial sampling period, i.e., when the flag firstCycle is TRUE as shown in the if condition. This enables smooth handover between a recovered $C_a$ with the currently engaged controller $C_b$ if a<b. This is why RCC sets the firstCycle flag to TRUE upon timeouts in the pseudocode in FIG. 7. Consider a case where an engaged controller $C_a$ suffers a link failure whereby the Polling step times out, and a backup controller $C_b$ is swapped in. If the link recovers, then $C_a$ takes over again after performing smooth handover with $C_b$ because upon recovery, the firstCycle flag of $C_a$ will be TRUE in FIG. 8.

The algorithm can be applied in the following scenarios:
Cloud controllers act as backups for physical controllers in systems requiring high reliability. This can achieve substantial cost savings compared to replicating all physical controllers.
Cloud controllers can be used to temporarily manage systems while their physical controllers are being upgraded or replaced due to failures. This is inline with the on-demand nature of cloud services, which are needed for short periods.
Cloud controllers can be deployed over private clouds to serve multiple facilities of the same company, which allows the control functions of all facilities to be consolidated over virtualized resources.

In each of these scenarios, the iAmEngaged flag is set to TRUE for the controller currently controlling the process. The same flag is set to FALSE for all other controllers. When it is necessary to switch controllers, the iAmEngaged flags are flipped. The recently swapped-in controller will start with an action equal to the last applied action.

2.3 Formal Arguments

A fail-stop failure model is now described for the cloud-based controller, the hosting VM, the hosting server, the network switch, and the Internet link. The following description formally proves the guarantees G1-G3.

Theorem 1. The proposed RCC algorithm guarantees normal operation of the controlled process as long as there is at least one operating controller that is accessible through at least one link.

Proof. Assume ψ is the nonempty set of healthy controllers. Further, assume that $C_s \in \psi$ is the controller with smallest ID s and smallest engagement threshold $D_s$. For all unhealthy controllers $C_i \in /\psi$ and i<s, the last action age counter $u_i$ will keep increasing since $C_i$ is not able to update the state tuple. Therefore, $u_i$ values will keep increasing until they all cross the engagement threshold of $C_s$, that is $D_s$. When this happens, $C_s$ will get engaged because the iAmEngaged flag will be evaluated as TRUE in the Computing step. Once $C_s$ becomes engaged, it will reset its last action age counter us in the state tuple. Other alive controllers $C_j \in \psi \setminus \{C_s\}$ will observe the reset event since the counter value is less than their engagement thresholds $D_j$. As a result, their iAmEngaged flags will be set to FALSE, forcing them to withhold their actions. Therefore, we always have exactly one controller managing the process, as long as there is at least one operating, reachable controller.

Theorem 2. If the original control algorithm guarantees zero overshoot and zero steady-state error under no failure, then RCC algorithm guarantees the same over-shoot and steady-state error performance under failure, provided that there is one operating reachable controller.

Proof. Assume the engaged controller $C_i$ fails at the discrete time instant n=k. The first action of the backup controller $C_j$ will reach the process after a finite number of sampling periods $\lceil (RTT_j+D_j)/T_s \rceil$, where $RTT_j$ is the round-trip Internet delay between $C_j$ and the process, $D_j$ is the engagement threshold of $C_j$, and $T_s$ is the sampling period. During this time, the control I/O interface is applying the last action received from $C_i$, which is m[k−1], where m[n] is the controller output signal. The following description proves that m[k−1] is a finite value and that holding m[k−1] for $\lceil (RT T_j+D_j)/T_s \rceil$ sampling periods does not affect the over-shoot or the steady state error.

First, the following description proves that m[k−1] is finite. Given that the engaged controller $C_i$ guarantees zero overshoot and steady state error under no failure, the process variable y[n] converges from its initial value to the set point with no oscillations. Since the set point r[n] is a constant function for n>0, then the error signal e[n]=r[n]−y[n] converges from its finite initial value to zero with no oscillations, which means that E(z) has stable, non-oscillatory poles, i.e., positive real poles inside the unit circle of the z-plane. The error is passed as an input to the controller. The controller transfer function $C_i$ (z) has positive real poles inside or on the unit circle. For example, a PID controller, which is the most common controller in practice, has no poles outside the unit circle (only one pole at z=1, i.e., on the unit circle). Thus, the controller output, which is M (z)=E (z)$C_i$ (z), has stable poles and a maximum of 1 pole on the unit circle at z=1. This is exactly equivalent to a signal resulting from applying a unit step input (a pole at z=1) to a stable transfer function (all other stable poles of E(z) and $C_i$ (z)).

Thus, the controller output signal m[n] converges from its finite initial value to a finite final value with no oscillations.

As a consequence, the signal m[k−1] held at the I/O interface during handover is between m[0] and $\lim_{n\to\infty}$m[n], which are both finite. Since the final value of the control action does not cause the process to overshoot, holding an intermediate action does not cause the process to overshoot either. This is because most real-life processes are open-loop stable processes. In the rare case of an open-loop unstable process, proper compensation is assumed at the process side. Given that the backup controller $C_j$ runs a control algorithm that produces zero overshoot and zero steady state value, when it takes over, it drives the process variable from its intermediate value to its desired final value with no oscillations, i.e., zero steady-state error and zero overshoot.

Theorem 3. The worst case increase in the settling time $t_s$ under one failure is upper-bounded by the Internet roundtrip delay $RTT_j$ and the engagement threshold $D_j$ of the backup controller $C_j$, and is given by $\Delta t_s = \lceil (RTT_j + D_j)/T_s \rceil - 2$, where $T_s$ is the sampling period.

Proof. The proof is straightforward for a person skilled in the art. For simplicity, final results are shown without derivations. Without loss of generality, a unity gain system is represented by its dominant time constant, and sampled periodically every 10% of its dominant time constant, which is the rule of thumb in designing the sampling period. The step response of such system can be derived as $y[n]=(1/11)\delta[n]+u[n-1]-(10/11)^{n+2}$. The settling time under no failure $t_s$ is defined as the time it takes the process to stay within 5% of the final value. We obtain the settling time $t_{s0}$ is obtained under no failure as 30 sampling periods. A similar analysis is used when a failure happens at discrete time instant k>0.

Under failure, $t_{sf}$ has 3 components:
  (i) $t_{s1}$, during which, the initial controller $C_i$ drives the process output from 0 to an intermediate value 0<α<1, before it fails. This leads to $t_{s1}=\log(1-\alpha)/\log(10/11)-2$.
  (ii) $t_{s2}$: this is the time it takes $C_j$ to detect and react to the failure. During this time, the controller output will be held at m[k−1], and the process output will be α as a lower bound (due to the first order lag, the process will actually advance to β where 0≤α≤β≤1, which is a better scenario). The proof of Theorem 2 shows that $t_{s2}=\lceil (RTT_j+D_j)/T_s \rceil$.
  (iii) $t_{s3}$: during this time, $C_j$ drives the process output from α to 0.95. This results in $t_{s3}=(\log(0.05)-\log(1-\alpha))/\log(10/11)-2$.

From the above discussion, we conclude $\Delta t_s=(t_{s1}+t_{s2}t_{s3})-t_{s0}=\lceil (RTT_j+D_j)/T_s \rceil - 2$.

Real life processes have time constraints of the order of seconds, and therefore have a sampling period in the order of hundreds of milliseconds. As a result, the Internet will normally introduce roundtrip delays $\gamma T_s$, where γ<1. If we set the delay threshold to be equal to 2 sampling periods, then the worst case change in settling time is $\Delta t_s = \lceil (\gamma T_s + 2T_s)/T_s \rceil - 2 = 1$. A change of 1 sampling interval in settling time corresponds to a 1/30=3.3% increase, which is a small amount. It is noteworthy that most processes run in steady state for the majority of their operation time, where failures will produce zero change in settling time.

Theorem 4. The RCC algorithm guarantees no change in process response upon controller recovery.

Proof. Assume a controller $C_j$ is currently engaged. Assume that $C_i$ where i<j, had a failure and is now recovered. Because $C_i$ has a lower ID, it will get engaged, and it will start updating the state maintained in the control I/O interface. It will take $(RTT_j+D_j)/T_s$ sampling periods for $C_j$ to detect that $C_i$ is back. During each of these sampling periods, the process will receive two control actions simultaneously, one from each controller. Because of the smooth handover algorithm in FIG. 8, $C_i$ will start from the last action of $C_j$. Throughout the period where they will both act, they will be sending the same action within the same sampling period. Therefore, the response will not differ from the case where only one controller is engaged. After this period, $C_i$ will completely take over as $C_j$ switches to standby.

3. Evaluation

The performance of the proposed cloud-based control approach is assessed rigorously in this section. The description below shows how cloud-based controllers of an embodiment of the invention can effectively control an industrial plant that is more than 8000 miles away. The description below also demonstrates how an embodiment of the invention can mitigate large Internet delays and dynamically switch among redundant controllers upon failure to achieve smooth and reliable functioning of a controlled industrial plant.

For testing purposes, an embodiment of the invention was implemented in LabVIEW software, which is a standard in both automation industry and lab testing. The approach was evaluated with the PID control method because it is, by far, the most commonly used in practice. LabVIEW PID controllers were deployed over Microsoft Windows Server instances on Amazon cloud2. Lab-VIEW was also used to emulate a medium-size industrial plant on a server located on the West Coast of North America. The standard Modbus/TCP protocol provided by LabVIEW was used for communication between plant processes and cloud controllers. Two cloud controllers were deployed on the furthest available (in terms of delay) Amazon cloud locations from the plant: Singapore and Sao Paulo, Brazil as shown in FIG. 9.

3.1 Experimental Setup

The industrial plant that was emulated was the solar power plant shown in FIG. 10. The operation of the solar power plant is divided into four main process cycles: synthetic oil cycle, salt cycle, steam cycle, and condensation cycle. The oil cycle collects the solar energy, while the salt cycle stores it to pump it later. The steam cycle and the condensation cycle are responsible for operating a steam turbine. The oil cycle starts at the solar collector mirrors, which collect the sun's heat along horizontal pipes passing through oil. The oil absorbs the heat and passes it in two branches to interact with the salt cycle and the steam cycle.

The salt cycle has two modes: heat storage and heat pumping. If the heat absorbed by the oil exceeds the required amount to run the plant, the salt is pumped from the cold tank to the hot tank to store the excessive heat. At times where solar energy drops below required levels (e.g., cloudy weather), the salt flow direction is reversed to pump heat into the oil. The oil is pumped into a heat exchanger to heat up water to generate steam. A natural gas heater is used to maintain the evaporation temperature should the solar heat and the salt-pumped heat drop below required levels.

The pressurized steam is fed through a steam turbine, which drives an electrical generator connected to the electrical power grid. The last cycle is the steam condensation required to create a vacuum at the downstream side of the turbine, which is necessary for an efficient steam cycle.

To control the solar power plant, nine control loops were identified which are shown in FIG. 10: (i) three angular position loops for the solar collector mirrors, (ii) three flow control loops; two for the oil cycle and one for the steam cycle, and (iii) three temperature controllers; one for the oil cycle, one for the steam cycle, and one for the condensation cycle. Additional control loops (e.g., for the turbine) are not shown for simplicity.

Performance results are presented from three representative control loops; one from each of the above three groups. The transfer functions of these loops were derived and their PID cloud controllers were designed using the Ziegler-Nichols method, and fine-tuned by trial and error. For each control loop, the state of the controlled process is periodically sampled and acquired by the corresponding controller, which computes the appropriate action and sends it back to the actuator of that process. The sampling period is typically set to 10% of the dominant time constant of the process. Most continuous industrial processes have sampling periods in the range of 0.5 to 2.0 seconds.

The dominant time constants were computed for the control loops considered in the evaluation, and the sampling periods were conservatively set at 10% of the time constants with a maximum sampling period of 1 second. Smaller sampling periods stress the cloud-based control approach, as they require faster response. The performance of the plant is examined under normal Internet delay as well as emulated large random delays to stress-test the approach. The performance is analysed when controllers and/or Internet links fail. The most common control-theoretic performance metrics are considered when the plant is subjected to step input or disturbance. These metrics are: (i) maximum overshoot percentage ($M_p$): normalized difference between the maximum overshoot and the final value; (ii) steady-state error ($e_{ss}$): difference between set point and final value of step response; and settling time ($t_s$): time taken by response to stay within 5% of final value.

3.2 Performance Under Internet Delay

The following section demonstrates the feasibility of the cloud-based control approach.

The description below shows that the cloud controllers yield the same performance as local controllers. Two of the control loops shown in FIG. 10: (i) the solar collector positioning process marked by AC1, and (ii) the temperature control process marked by TC1 where the salt stores or pumps heat to regulate the oil temperature.

Solar Collector Positioning. A solar collector has moving parts that weigh 1,000 Kg. The parabolic trough mirror has a focal length of 1 m. The collector rotates around the focal axis of the mirror. A large DC motor with a gearbox, whose gear ratio is 100, drives the collector. The transfer function is derived as $\Theta(s)/V_f(s)=0.1/(s^3+18\ s^2+80\ s+10)$, where $\Theta(s)$ and $V_f(s)$ are the Laplace transform functions of the collector's angular position, and the voltage applied to the field circuit of the DC motor, respectively. The dominant time constant of this transfer function is 7.77 s. Therefore, a sampling period of 750 ms was chosen. The desired collector angular position is derived as arccos(cos(g) sin(a)), where g is the altitude angle of the sun, and a is the azimuth angle measured from the south. The change of the sun angle was emulated in Houston, Tex. for one hour on Jul. 1, 2012. The desired collector angle changes in a ramp fashion from 44.3 to 57.1 degrees between 10:00 and 11:00 am. The initial position of the collector was zero degrees. A wind disturbance effect was emulated between 10:20 and 10:40 am, which increases in the first half of the period and decreases in the second half. The applied disturbance has an impact of up to 7 degrees. The disturbance transfer function is approximated by $\Theta(s)/D_f(s)=75\times10^{-5}/(s^2+7.6\ s+0.75)$, where $D_f(s)$ is the Laplace transform of the wind force disturbance.

FIG. 11 shows the results, where the desired solar collector angle (Set Point) is plotted. Angles achieved by the cloud feedback controller (Cloud FB) and a controller running on the same machine as the emulated process (Local FB) both kept the performance of the process at the desired set point. In FIG. 11(a), the angle achieved by an open-loop controller is shown to demonstrate the significance of the wind disturbance. The results in FIG. 11(a) clearly show that the cloud controller performed the same as the local controller. FIG. 11(b) zooms in the initial 4 minutes to illustrate the transient response, whereas FIG. 11(c) zooms in the first half of the period in which the wind disturbance occurred. Both figures confirm that the performance of the proposed cloud controller (deployed thousands of miles away) is indistinguishable from the performance of the local controller.

Oil Temperature Regulation. The above experiment was repeated for the temperature control process, which is quite different from the solar collector positioning process. This temperature control process decides whether the salt stores or pumps heat and the amount of heat to be stored/pumped in order to regulate the oil temperature. The temperature measured by TT1 in FIG. 10 depends on the operation of the whole oil cycle. As a result, the operation of the two oil heat exchangers was emulated. The solar collector was emulated as an additional heat exchanger. A heat exchanger was emulated with a transfer function with dominant time constants that range between 20 and 30 s. The transfer function of the salt interaction is given by $O(s)/V_p(s)=5/(25\ s+1)(3\ s+1)$, where $O(s)$ and $V_p(s)$ are the Laplace transform functions of the outlet oil temperature and the voltage applied to the pump motor drive, respectively. The effect of a temporary cloudy weather condition for one hour was also emulated. The transfer function of this disturbance is approximated as a first order system whose time constant is 5 min. The dominant time constant of the whole process is computed as 189 s, but the maximum sampling period of 1 s was used to stress the system.

FIG. 12(a) shows the results of a two-hour period between 13:00 and 15:00, with the temporary cloudy weather disturbance taking place between 13:30 and 14:30. FIG. 12(a) shows that the cloud controller maintains the temperature at the set point in the same way the local controller does, while the temperature deviates significantly from the set point under the open-loop controller. FIG. 12(b) zooms in the period between 13:15 and 14:00 to show that both the cloud and local controllers handled the disturbance well. To further illustrate the actions taken by the two controllers, FIG. 12(c) plots how the two controllers reversed the salt flow direction to switch from heat storing to heat pumping in order to mitigate the disturbance caused by the cloudy conditions. Negative values on the y-axis in FIG. 12(c) indicate heat storing while positive values indicate heat pumping.

3.3 Performance Under Large Artificial Delays

To test the robustness of the system and show the effect of the delay compensator, a large random delay is artificially inserted when controlling a process with a short time constant. Delay distributions, with approximate values of (mean µ, standard deviation σ, and maximum max) of (100, 70, 500) ms we used, but the x-axis is multiplied by a scaling factor to substantially increase the delay. Scaling factors of 10, 20, and 40 are used to appropriately scale the probability distribution so that the area under the curve remains equal to 1. This scaling yields excessive delays with (µ, σ, max) values of (1, 0.7, 5), (2, 1.4, 10), and (4, 2.8, 20) seconds, respectively. These large delays are introduced between the cloud controllers and the emulated plant operation. Under such distributions, packets were subject to delay with high variability, which caused packets to arrive out of order.

These delays could represent situations when congestion happens at routers, formation of transient routing loops, or change of routing tables due to failures or recoveries of network links.

The water flow process, marked by FC3 in FIG. 10, was evaluated. A short time constant of 3 s is assumed, and so a sampling period of 300 ms is used. The inserted delay is an order of magnitude larger than the sampling period. For each delay distribution, an experiment is conducted with a delay compensator of an embodiment of the invention and another without it. The delay block in our delay compensator is set to $\lfloor(\mu+3\sigma)/Ts\rfloor$, where Ts is the sampling period. Therefore, for the 3 delay distributions under consideration, the delay block is set to z-10, z-20, and z-40, respectively. The compensated and uncompensated performance is compared to the zero-delay case as a baseline. For the compensated case, each experiment is repeated 10 times and the worst performance is picked. The results of this experiment are shown in FIG. 13 for the three delay distributions. FIG. 13 shows that as larger delays are introduced, the "Uncompensated" cloud control loop overshoots (FIGS. 13(a) and 11(b)) and eventually goes unstable (FIG. 13(c)). Whereas the delay compensator of an embodiment of the invention maintains smooth response with no apparent overshoots.

Table 1 shown in FIG. 14 summarizes the performance metrics using the delay compensator of an embodiment of the invention ("compensated") and without using it ("uncompensated").

In terms of maximum overshoot and steady-state error, the compensated controller maintained the same performance throughout the 4 distributions. In other words, the system did not suffer under such extreme delay conditions and performed as if there was no delay. The only minor exception is the maximum overshoot of the last distribution ($\mu=4$ s, $\sigma=2.8$ s, max=20 s), which came out as 0.3%, which is considered substantially zero.

On the other hand, the performance of the uncompensated controller kept deteriorating as the inserted delay increases. So, it moved from zero maximum overshoot and zero steady state error under no delay, to become unstable under the last delay distribution, under which, the (observable) maximum over-shoot increased significantly to 170.9%, and the steady state error was undetermined, hence the "undet" entries in Table 1. The settling time increased with the inserted delay for both compensated and uncompensated controllers, while the compensated controller performed significantly better under the third and fourth delay distributions ($\mu=2$, 4 s, $\sigma=1.4$, 2.8 s, max=10, 20 s). For the last distribution, the uncompensated controller went unstable and never settled, hence the "undet" settling time in Table 1.

In summary, the system was tested under extreme conditions: abrupt change in set point (step input) under extremely large delay, up to 20 s, i.e., 66 times the sampling period, which is 300 ms. Such extremely difficult conditions should unstabilize the controlled process, which happened under the uncompensated controller. Nevertheless, under such extreme conditions, the system keeps the controlled process from overshooting or deviating from the final value by only increasing the settling time. In normal conditions, however, the settling time will suffer subtle (if not zero) increase as it is the case with the real-delay experiments.

3.4 Fault Tolerance and Smooth Handover

This section shows how cloud-based controllers can achieve smooth handover in case of failures. The real-delay experiment is repeated with two redundant controllers placed as shown in FIG. 9. The time response of the RCC algorithm under failures is compared to that of no failures.

A step input is introduced to the water flow process (FT3, FC3) shown in FIG. 10. A dominant time constant of 5 s is assumed, and therefore, a sampling period of 500 ms. The step input is applied at t=0 s. The primary controller is failed by disabling its TCP connection at t=18 s, and the primary controller returns back to operation at t=170 s. These time instants are selected so that there is one handover event during the transient state and another during the steady state.

The normalized response of the water flow process is plotted in FIG. 15(a) The results show that the RCC algorithm successfully mitigated the failure and the performance appears as if there are no failures. The same plot shows the effect of not employing RCC, which shows that the response is delayed due to the failure and an overshoot appears for lack of the smooth handover mechanism. The engagement threshold of the secondary controller is set to 4 sampling periods (2 seconds), so the settling time increased by 2.6% from 78 s under no failures to 80 s under RCC-handled failure.

To illustrate the importance of the smooth handover method, the same experiment is performed while the smooth handover feature of RCC is disabled and plot the results are plotted in FIG. 15(b). Controllers with no smooth handover capability ("RCC (No S.H.)") maintained the response close to the desired set point. However, they introduced two bumps in the process output during handover events. Thus, the smooth handover feature is important for ensuring smooth response under failures.

4. Conclusions

Offering automatic feedback control as a new cloud service has several potential benefits for many practical systems, including industrial, computing, and communication systems. Cloud controllers could replace or act as backups for existing controllers, providing cost saving and agility. However, communicating sensing/acting data in a timely and reliable manner is a major challenge.

Embodiments of the invention provide a method and architecture to provide feedback control as a cloud service. Methods of embodiments of the invention: (i) mitigate variable Internet delays without affecting the original controller design or requiring extra support from the controlled system, (ii) add reliability through an asynchronous algorithm to automatically hot-swap backup controllers upon failures, and (iii) ensure smooth handover between controllers. All methods are supported by current industrial packages.

Experimental results show that the controlled system was not affected by harsh conditions as an embodiment of the invention mitigates all of them to deliver the same performance as a local controller. Thus, the feedback control cloud service can deliver the same performance for lower cost and higher agility as promised by the cloud computing model.

In the present specification "comprise" means "includes or consists of" and "comprising" means "including or consisting of".

TECHNIQUES AVAILABLE FOR IMPLEMENTING ASPECTS OF EMBODIMENTS OF THE INVENTION

[1] T. Abdelzaher, Y. Diao, J. L. Hellerstein, C. Lu, and X. Zhu. Introduction to Control Theory And Its Application to Computing Systems Performance Modeling and Engineering. In Performance Modeling and Engineering, chapter 7, pages 185-215. Springer US, 2008.

[2] Introduction to Modbus TCP/IP (white paper). http://www.acromag.com/sites/default/files/Acromag_Intro_ModbusTCP_765A.pdf, 2005.

[3] M. Bandyopadhyay. Control Engineering Theory and Practice. Prentice-Hall of India, 2006.

[4] J. Bendtsen, J. Stoustrup, and K. Trangbaek.
Bumpless transfer between advanced controllers with applications to power plant control. In Proc. of IEEE Conference on Decision and Control, volume 3, pages 2059-64, December 2003.

[5] S. Bhattacharyya, A. Datta, and L. Keel. Linear Control Theory: Structure, Robustness, And Optimization. CRC Press, 2009.

[6] M. Bjorkqvist, L. Chen, M. Vukolic, and Z. Xi. Minimizing retrieval latency for content cloud. In Proc. of IEEE INFOCOM, 2011.

[7] Y. Chen, Z. Du, and M. Garcia-Acosta. Robot as a service in cloud computing. In Proc. of IEEE International Symposium on Service Oriented System Engineering, 2010.

[8] Z. Chen, L. Liu, and X. Yin. Networked control system with network time-delay compensation. In Proc. of Industry Applications Conference, volume 4, pages 2435-40, 2005. [9] DS2:Delay Space Synthesizer. http://www.cs.rice.edu/~bozhang/ds2/. [10] L. Desborough and R. Miller. Increasing customer value of industrial control performance monitoring—Honeywell's experience. In Preprint of Chemical Process Control, 2002.

[11] V. Gabale, P. Dutta, R. Kokku, and S. Kalyanaraman. InSite: QoE-aware video delivery from cloud data centers. In Proc. of International Symposium on QoS, 2012.

[12] X. Gao and L. Schulman. Feedback control for router congestion resolution. In Proc. of ACM Symposium on Principles of Distributed Computing, 2005.

[13] M. Gopal. Digital Control Engineering. New Age International, 1998.

[14] M. Gopal. Control Systems: Principles and Design. Tata McGraw-Hill, 2006. Reprinted from the 2002 original.

[15] U. Herrmann, B. Kelly, and H. Price. Two-tank molten salt storage for parabolic trough solar power plants. Energy, 29(5-6):883-93, April 2004.

[16] S. Kumar, S. Gollakota, and D. Katabi. A cloud-assisted design for autonomous driving. In Proc. of SIGCOMM MCC workshop on Mobile Cloud Computing, 2012.

[17] Why Use LabVIEW? http://www.ni.com/white-paper/8536/en.

[18] C. Lu, Y. Lu, T. Abdelzaher, J. A. Stankovic, and S. Son. Feedback control architecture and design methodology for service delay guarantees in web servers. IEEE Transactions on Parallel and Distributed Systems, 17(7), September 2006.

[19] K. Natori and K. Ohnishi. A design method of communication disturbance observer for time-delay compensation, taking the dynamic property of network disturbance into account. IEEE Transactions on Industrial Electronics, 55(5):2152-68, May 2008.

[20] P. Patras, A. Banchs, and P. Serrano. A control theoretic scheme for efficient video transmission over ieee 802.11e edca wlans. ACM Transactions on Multimedia Computing Communications and Applications, 8(3):29:1-29:23, August 2012.

[21] J. Rossiter. Model-Based Predictive Control: A Practical Approach. CRC Press, 2004.

[22] J. Sherry, S. Hasan, C. Scott, A. Krishnamurthy, S. Ratnasamy, and V. Sekar. Making middleboxes someone else's problem: network processing as a cloud service. In Proc. of SIGCOMM, 2012.

[23] Smith Predictor for Control of Processes with Dead Times. http://support.automation.siemens.com/WW/view/en/37361207, 2009.

[24] G. Smaragdakis, N. Laoutaris, I. Matta, A. Bestavros, and I. Stavrakakis. A feedback control approach to mitigating mistreatment in distributed caching groups. In Proc. of IFIP-TC6 Conference on Networking Technologies, Services, and Protocols, 2006.

[25] O. Smith. Closer control of loops with dead time. Chemical Engineering Progress, 53(5):217-9, May 1957.

[26] Solar plots. http://www.solarplots.info/. [27] H. Wade. Basic and Advanced Regulatory Control:
System Design and Application. ISA, 2004. [28] T. Wood, E. Cecchet, K. Ramakrishnan, P. Shenoy, J. van der Merwe, and
A. Venkataramani. Disaster recovery as a cloud service: economic benefits & deployment challenges. In Proc. of USENIX Conference on Hot Topics in Cloud Computing, 2010.

[29] X. Xu. From cloud computing to cloud manufacturing. Robotics and Computer-Integrated Manufacturing, 28(1): 75-86, February 2012.

[30] S. Yang, X. Chen, L. Tan, and L. Yang. Time delay and data loss compensation for internet-based process control systems. Transactions of the Institute of Measurement and Control, 27(2):103-18, June 2012.

[31] Y. Yang, Y. Wang, and S.-H. Yang. A networked control system with stochastically varying transmission delay and uncertain process parameters. In Proc. of IFAC, volume 16, 2005.

The invention claimed is:
1. A control system comprising:
a first hardware component,
a second hardware component, the first and second hardware components outputting a process variable,
a server which is remote from the hardware components, wherein the hardware components are in communication with the server so that data can be communicated between the hardware components and the server using a field-level protocol,
a primary control module which is implemented as a service running on the server, the primary control module forming part of a direct control layer in the control system and being operable to communicate with the hardware components using the field-level protocol to control at least one of the hardware components,
a feedback loop which communicates the process variable to an input of the primary control module,
a controller with delay compensator which modifies the process variable by a delay compensation value via an artificial delay block to compensate for a delay in the communication between the primary control module and the hardware components, the controller with delay compensator including a Smith Predictor, the Smith Predictor modifying a process error instead of the process variable by a delay compensation value to compensate for a delay in the communication between the primary control module and the hardware components, and
a comparator unit which incorporates a first input which receives the process variable and a second input which receives a reference value, wherein the comparator unit compares the process variable with the reference value and outputs a comparison value to an input of the primary control module, and wherein the controller with delay compensator modifies the process variable or an error value by the delay compensation value.

2. The control system according to claim 1, wherein the primary control module is a direct continuous control module which is operable to control at least one of the hardware components continuously and is a direct digital control module.

3. The control system according to claim 1, wherein one of the hardware components is at least one of: a sensor and an actuator.

4. The control system according to claim 1, wherein the hardware components and server form part of a cloud network.

5. The control system according to claim 1, wherein the system further comprises a user interface which is in communication with the server to enable a user to interact with the server to monitor and control the primary control module, wherein the user interface is implemented as a platform as a service (PaaS) or a system as a service (SaaS).

6. The control system according to claim 1, wherein the delay compensator module selects the delay compensation value to correspond with the roundtrip time delay in communication between the primary control module and at least one of the hardware components.

7. The control system according to claim 1, wherein system further comprises:
a delay estimator module which is operable to estimate the roundtrip time delay in the communication between the primary control module and at least one of the hardware components.

8. The control system according to claim 1, wherein the delay compensator module modifies the process variable gradually over a predetermined period of time.

9. The control system according to claim 1, wherein the system further comprises:
a secondary control module which is implemented as a service running on the server, the secondary control module being operable to communicate with the hardware components to control at least one of the hardware components, wherein each control module is configured to operate in a standby mode in which it does not send control actions to the hardware components and in an engaged mode in which it sends control actions to the hardware components, wherein each control module is operable to communicate to check the operating mode of the other control module, and wherein one control module is operable to switch to the engaged mode if the other control module is not operating in the engaged mode, and upon initialisation of the system, the primary control module operates in the engaged mode and the secondary control module operates in the standby mode.

10. The control system according to claim 9, wherein the system comprises an input/output (I/O) interface and each control module is connected to communicate with the I/O interface and the I/O interface incorporates a time recordal module which is operable to record a time value indicative of the time since each control module was last engaged and communicated control data to at least one of the hardware components and each control module is operable to poll the I/O interface for a predetermined sampling period to determine the time value recorded by the time recordal module of the other control module.

11. The control system according to claim 9, wherein the primary control module is allocated a first ID number and the secondary control module is allocated a second ID number which is greater that the first ID number and the control module with the lowest ID number is configured to operate in the engaged mode.

12. The control system according to claim 1, wherein the system further comprises:
at least one further control module which is implemented as a service running on the server, each further control module being operable to communicate with the hardware components to control at least one of the hardware components, wherein each further control module is configured to operate in a standby mode in which it does not send control actions to the hardware components and in an engaged mode in which it sends control actions to the hardware components, wherein each further control module is operable to communicate with the I/O interface to determine the operating mode of the other control modules.

13. The control system according to claim 12, wherein at least one control module is implemented as a service running on a different server to at least one of the other control modules and/or the servers are at different geographic locations to one another.

14. The control system according to claim 12, wherein each control module incorporates an integrator and each control module is operable to communicate the value of its integrator to the other control modules, wherein each control module operating in the standby mode is configured to set its integrator value to correspond with the integrator value of the control module operating in the engaged mode so that each control module operating in the standby mode is ready to switch smoothly to the engaged mode.

15. The control system according to claim 12, wherein each control module operating in the standby mode is operable to set its set point to the same value as the set point of the control module operating in the engaged mode.

16. The control system according to claim 1, wherein the primary control module is implemented as a service running in a virtual machine which is running on the server.

17. The control system according to claim 12, wherein each other control module is implemented as a service running in a virtual machine which is running on one or more separate servers.

* * * * *